(12) United States Patent
Sawada

(10) Patent No.: US 11,065,579 B2
(45) Date of Patent: Jul. 20, 2021

(54) CATALYTIC COMBUSTION IN LOW TEMPERATURE, HUMID CONDITIONS

(71) Applicant: James Sawada, Edmonton (CA)

(72) Inventor: James Sawada, Edmonton (CA)

(73) Assignee: James Sawada, Edmonton (CA)

(*) Notice: Subject to any disclaimer, the term of this patent is extended or adjusted under 35 U.S.C. 154(b) by 120 days.

(21) Appl. No.: 16/332,954

(22) PCT Filed: Sep. 1, 2017

(86) PCT No.: PCT/CA2017/051036
§ 371 (c)(1),
(2) Date: Mar. 13, 2019

(87) PCT Pub. No.: WO2018/049512
PCT Pub. Date: Mar. 22, 2018

(65) Prior Publication Data
US 2020/0179874 A1    Jun. 11, 2020

Related U.S. Application Data

(60) Provisional application No. 62/395,378, filed on Sep. 16, 2016, provisional application No. 62/437,036, filed on Dec. 20, 2016.

(51) Int. Cl.
*B01D 53/86* (2006.01)
*B01J 23/04* (2006.01)
(Continued)

(52) U.S. Cl.
CPC ......... *B01D 53/864* (2013.01); *B01D 53/261* (2013.01); *B01J 23/04* (2013.01);
(Continued)

(58) Field of Classification Search
USPC .................................................. 423/245.3
See application file for complete search history.

(56) References Cited

U.S. PATENT DOCUMENTS 4,331,693 A    5/1982   Wojciechowski et al.
4,506,599 A    3/1985   Wojciechowski et al.
(Continued)

FOREIGN PATENT DOCUMENTS

GB    2163637 A    3/1986
JP    2012081458 A    4/2012

OTHER PUBLICATIONS

Bond, Geoffrey C., et al., "Oxidation of Carbon Monoxide over Palladium-Tin(IV) Oxide Catalysts: An Example of Spillover Catalysis", J.C.S. Chem. Comm, Jan. 1, 1975; pp. 796-797: Downloaded by University of Alberta on Jan. 6, 2016.
(Continued)

*Primary Examiner* — Anita Nassiri-Motlagh
(74) *Attorney, Agent, or Firm* — Jeffrey N. Townes; Cozen O'Connor

(57) ABSTRACT

Methods are disclosed for achieving the catalytic combustion of a gaseous species in low temperature humid environments. The methods comprise the steps of obtaining a combustion catalyst composition comprising an amount of a precious metal supported on an ion-exchangeable alkali metal titanate substrate, and then exposing the species to the combustion catalyst composition in the presence of an oxygen containing gas and water vapour at a catalysis temperature below 200° C. and at a relative humidity above 0.5%. A novel desiccant-coupled catalytic combustion process and system are also disclosed.

27 Claims, 6 Drawing Sheets

(51) Int. Cl.
| | |
|---|---|
| *B01J 23/44* | (2006.01) |
| *B01J 23/52* | (2006.01) |
| *B01J 23/60* | (2006.01) |
| *B01J 23/62* | (2006.01) |
| *B01J 37/10* | (2006.01) |
| *B01J 37/30* | (2006.01) |
| *B01D 53/26* | (2006.01) |

(52) U.S. Cl.
CPC .............. *B01J 23/44* (2013.01); *B01J 23/52* (2013.01); *B01J 23/60* (2013.01); *B01J 23/626* (2013.01); *B01J 37/10* (2013.01); *B01J 37/30* (2013.01); *B01D 2255/106* (2013.01); *B01D 2255/1021* (2013.01); *B01D 2255/1023* (2013.01); *B01D 2255/2027* (2013.01); *B01D 2255/2094* (2013.01); *B01D 2255/20707* (2013.01); *B01D 2255/20792* (2013.01); *B01D 2257/502* (2013.01); *B01D 2257/7022* (2013.01); *B01D 2258/06* (2013.01)

(56) References Cited

U.S. PATENT DOCUMENTS

| | | |
|---|---|---|
| 4,511,455 A | 4/1985 | Dosch et al. |
| 4,853,202 A | 8/1989 | Kuznicki |
| 4,929,582 A | 5/1990 | Dosch et al. |
| 5,008,091 A | 4/1991 | Bassi et al. |
| 5,164,168 A | 11/1992 | Bassi et al. |
| 5,177,045 A | 1/1993 | Anthony et al. |
| 5,354,540 A | 10/1994 | Neumiller |
| 5,461,022 A | 10/1995 | Dosch et al. |
| 5,484,574 A | 1/1996 | Macaluso et al. |
| 6,207,120 B1 | 3/2001 | Belmonte et al. |
| 7,214,351 B2 | 5/2007 | Teshima et al. |
| 8,580,226 B2 | 11/2013 | Knoll et al. |
| 2010/0179053 A1* | 7/2010 | Lin ................... B01J 37/0201 502/11 |

OTHER PUBLICATIONS

Bunker, B.C., et al., "Hydrous Sodium Titanate Ion-Exchange Materials for Use as Catalyst Supports", Chapter 8, Characterization and Catalyst Development, ACS Symposium Series; American Chemical Society: Washington, DC, 1989.

Burch, R., "Platinum-Tin Reforming Catalysts", Journal of Catalysis (1981), vol. 71, pp. 348-359.

Du, Wenxin, et al., "Palladium-Tin Alloyed Catalysts for the Ethanol Oxidation Reaction in an Alkaline Medium", ACS Catalysis, American Chemical Society (2012), vol. 2, pp. 287-297.

El Blidi Altaf, et al., "Ethylene Removal For Long Term Conservation of Fruits and Vegetables", Food Quality and Preference, Jul. 15, 1993, vol. 4 (3), pp. 119-126, [online] [retrieved on Dec. 5, 2017]. Retrieved from the Internet: <https:doi.org/10.1016/0950-3293 (93) 90154-X>.

Freakley, Simon J., et al., "Palladium-tin catalysts for the direct synthesis of H2O2 with high selectivity", Science Magazine, Feb. 26, 2016, vol. 351, Issue 6276, pp. 965-968.

Haruta, Masatake, "Novel catalysis of gold deposited on metal oxides", Catalysis Surveys of Japan 1(1997), Baltzer Science Publishers BV, pp. 61-73.

Hay, Stephen O., et al., "The Viability of Photocatalysis for Air Purification", Molecules 2015, vol. 20, pp. 1319-1356; doi:10.3390/molecules20011319.

Huang, Haibao, et al., "Low temperature catalytic oxidation of volatile organic compounds: a review", Catal. Sci. Technol. 2015, vol. 5, pp. 2649-2669.

Jiang, Chuanxia, et al., "Low-Temperature Oxidation of Ethylene over Platinum Nanoparticles Supported on Mesoporous Silica", Angewandte Chem. Int. Ed. 2013, 52, pp. 6265-6268.

Keller, Nicolas, et al., "Ethylene Removal and Fresh Product Storage: A Challenge at the Frontiers of Chemistry. Toward an Approach by Photocatalytic Oxidation", Chemical Reviews, Apr. 16, 2013, vol. 113 (7), pp. 5029-5070, [online] [retrieved on Dec. 1, 2017]. Retrieved from the Internet: <http://pubs.acs.org/doi/full/10.1021/cr900398v>.

Li, Jinjun, et al., "Efficient Elimination of Trace Ethylene over Nano-Gold Catalyst under Ambient Conditions", Environ. Sci. Technol. 2008, vol. 42, No. 23, pp. 8947-8951.

Liotta, L.F., "Catalytic oxidation of volatile organic compounds on supported noble metals", Applied Catalysis B: Environmental 100 (2010), pp. 402-412.

Ma, Chun Yan, et al., "Mesoporous Co3O4 and Au/Co2O4 Catalysts for Low-Temperature Oxidation of Trace Ethylene", J. Am. Chem. Soc. 2010, vol. 132, pp. 2608-2613.

Masai, Mitsuo, et al., "Dehydrogenation and Hydrogenation Activity of Palladium-Tin-Silica and Nickel-Tin-Silica", Journal of Catalysis (1977), vol. 50, pp. 419-428.

Spivey, James J., "Complete Catalytic Oxidation of Volatile Organics", Ind. Eng. Chem. Res. 1987, American Chemical Society, vol. 26, pp. 2165-2180.

Stephens, Howard P., et al., "Hydrous Metal Oxide Ion Exchangers for Preparation of Catalysts for Direct Coal Liquefaction", Ind. Eng. Chem. Prod. Res. Dev. 1985, vol. 24, pp. 15-19.

Sun, Xiaoming, "Synthesis and Characterization of Ion-Exchangeable Titanate Nanotubes", Chem. Eur. J. 2003, vol. 9, pp. 2229-2238.

Thomas, J.M., et al., "Principles and Practice of Heterogeneous Catalysis", Second, Revised Edition, Wiley-VCH GmbH & Co., 2015.

Van De Beld, L., et al., "A kinetic study of the complete oxidation of ethene, propane and their mixtures on a Pd/Al2O3 catalyst", Chemical Engineering and Processing, vol. 34 (1995), pp. 469-478.

Xanthopoulou, G.G., et al., "Nanocatalysts for Low-Temperature Oxidation of CO: Review", Eurasian Chemico-Technological Journal, vol. 17 (2015), pp. 17-32.

Yasuda, Keisuke, et al., "Low-Temperature Complete Combustion of Volatile Organic Compounds over Novel Pt/CeO2—ZrO2—SnO2/y-Al2O3 Catalysts", Bull. Chem. Soc. Jpn. vol. 85, No. 4, pp. 522-526 (2012).

Yu, Zhengnan, et al., "PtZn-ETS-2: A Novel Catalyst for Ethane Dehydrogenation", American Institute of Chemical Engineers (2015), vol. 61, No. 12, pp. 4367-4376.

Zagory, Devon, et al., "Modified Atmosphere Packaging of Fresh Produce", Food Technology 42(9): pp. 70-77; 1988.

\* cited by examiner

CATALYTIC COMBUSTION IN LOW TEMPERATURE, HUMID CONDITIONS

CROSS-REFERENCE TO RELATED APPLICATIONS

This application is a 371 National Stage application of International PCT Application No. PCT/CA2017/051036, filed Sep. 1, 2017, and claims priority to U.S. Provisional Patent Application No. 62/395,378, filed Sep. 16, 2016; and U.S. Provisional Patent Application No. 62/437,036, filed Dec. 20, 2016, all of which are incorporated herein by reference in their entirety.

TECHNICAL FIELD

The present invention pertains to methods for achieving catalytic combustion of a gaseous species at low temperature and in humid conditions. The methods employ catalytically active precious metals, optionally combined with transition metals, which have been ion exchanged onto an ion-exchangeable alkali metal titanate substrate. The invention also relates to a desiccant-coupled catalytic combustion process and system.

BACKGROUND

The development of new or improved catalysts has, for centuries, been the domain of the experimentalist and the development of most modern catalysts has progressed along empirical lines. Only once a catalyst is discovered to have new or improved function is work undertaken to understand, using the tools of the day, why a particular formulation functions well while other similar formulations may not. Unfortunately, predictions are difficult to draw from such work because theories which were once in vogue with respect to catalyst mechanism are now considered past fashion as new methods of catalyst investigation are developed. While modern computational methods have combined with organometallic materials research to offer some opportunity to custom design catalysts, the ability to design catalysts, a priori, remains largely out of reach.

The text book Principles and Practice of Heterogeneous Catalysis. Second Edition (eds. J. M. Thomas and W. J. Thomas). Wiley-VCH, 2015 the editors state in the Preface "Whilst it is illusory to imagine that one may soon (or ever) arrive at one all-embracing theory of heterogeneous catalysis—in the sense that we have a theory of electromagnetism, or of gravity or evolution—much needs to be done . . . to illuminate several dark theoretical and related corners of the subject." The editors go on to state that "Hitherto practitioners and theorists in the field of catalysis have not been able to devise a generally applicable way of assembling new heterogeneous catalysts, capable of facilitating the sweep of conversions embracing regio-selective, shape-selective and enantioselective processes. It is not enough to interpret the behaviour of existing catalysts, however subtle, refined or sophisticated the techniques, arguments and theories may be. It is essential to be able to arrive at new catalysts that, for example, may effect selective oxidations and reductions, and that can serve as new (environmentally benign) ways of producing heavy chemicals . . . ."

While perhaps less arcane than it once was, catalyst development remains a largely discovery-based process. While the knowledge base provided by the prior art can help populate a combinatorial chemistry campaign, knowledge of what has been done before does not ensure a successful outcome for any new study. As such, it is generally understood by those skilled in the art that any change in a catalyst formulation that nets a benefit—from the choice of substrate to the conditions used to prepare or condition the catalyst for use—is generally considered novel because the effect of the change(s) could not be reasonably predicted.

Catalytic combustion is a chemical process whereby a combustible species, in the gas phase, is reacted over a solid catalyst to completely oxidize the target molecules. For molecules containing only carbon and hydrogen (hydrocarbons) or molecules containing carbon, hydrogen, and oxygen (such as alcohols, aldehydes, and ketones) the products of catalytic combustion are solely carbon dioxide and water. Catalytic combustion is frequently, but not exclusively, employed in applications where the concentration of the target species is below its lower ignition limit (LEL). When combustible gases are below their LEL then the mixture will not ignite when exposed to an ignition source. At such dilute concentrations, it is more efficient to use catalysts to react, convert, or combust, the target compounds because a catalyst can facilitate complete oxidation of the target species at a temperature significantly lower than the auto-ignition temperature of the molecule which may be as high as 800° C. It is generally desirable to develop catalysts that are capable of facilitating catalytic combustion at the lowest possible temperature in order to reduce the energy costs associated with operating a catalytic combustion system. Complete catalytic combustion of a target species can only occur when oxygen gas ($O_2$) is found in molar stoichiometric excess; a condition which is easily met when the target species is present in trace quantity in air. Even in a reduced-oxygen environment, provided more moles of $O_2$ are present compared to moles of carbon atoms to be combusted then complete combustion of the target species can be realized.

A major application of catalytic combustion is related to the removal of volatile organic compounds (VOCs) from air. VOCs are predominantly anthropogenic, organic compounds that have a high vapour pressure at ambient temperature. Such compounds can be alcohols, aldehydes, acetates, aromatics (such as benzene, toluene, and xylene) esters, ketones, alkanes, alkenes, and other compounds comprised of carbon, oxygen, hydrogen, and halogens. To simplify the discussion as it relates to low temperature catalytic combustion, ethylene ($C_2H_4$), carbon monoxide (CO), and formaldehyde ($CH_2O$) will be considered VOCs though, formally, some of these species are excluded from the standard definition of such. The sources of emission of such compounds are varied and VOCs and can be generated by plants, the combustion of fossil fuels, paints and coatings, and from construction and consumer products.

Catalytic combustion of VOCs typically takes place over a catalyst bed at elevated temperatures where the catalysis temperature can be dictated by the reactivity of the VOC with the catalyst. Catalyst bed operating temperatures in the range of 200 to 450° C. are typical. The products of combustion may be recycled back to the process or, more often, and to meet environmental regulations, a contaminated air stream is treated with a catalytic combustion system to remove the VOC compounds before the stream is vented to the atmosphere. Most such systems, in order to recover at least some of the energy spent heating the catalyst bed, will engage in some form of heat exchange before the stream is vented. The exhaust stream comprising the treated air is thus cooler than its reaction temperature but typically remains above ambient temperature.

An emerging field of application for catalytic combustion is related to the removal of ethylene from air. Ethylene, also called ethene, is an alkene (an unsaturated hydrocarbon) due to the double bond present in its structure. Ethylene is a potent plant hormone and is generally considered to be responsible for directing the aging process of plants. Ethylene is naturally produced by plants to regulate their life cycle and the gas plays a key role in abscission (the loss or dropping of leaves and fruit), flower formation, as well as fruit growth and ripening. Only trace levels of ethylene, measured in single parts-per-million by volume, are required to provoke metabolic changes in plants and their flowers and fruits. Lowering plant metabolism by storing the goods at sub-ambient temperatures (e.g. <30° C.) is a key tactic in the post-harvest handling of fruits and ornamental plants and flowers and can reduce the unwanted production of ethylene. Ethylene can also be beneficially used to provoke ripening in ethylene-sensitive produce by exposing the green fruit to a source of non-endogenous ethylene. In climacteric fruits, the exposure to high concentrations of ethylene provokes a rapid ripening cycle allowing durable, green fruit to be shipped to market and artificially ripened just prior to sale.

Beyond refrigeration, modified and controlled atmosphere storage are other management techniques used to control fruit metabolism and to reduce the associated production of ethylene. In both instances the molecular composition of the gas around the produce is changed to alter its metabolism. By reducing $O_2$ levels and increasing $CO_2$ levels the produce can be held in metabolic stasis and have its freshness maintained for longer periods of time. Controlled atmosphere storage requires constant monitoring and maintenance of the target atmospheric composition; a demand that is more suitable for fixed storage facilities. Modified atmosphere storage, however, is generally applied to packaging applications and typically uses polymer films to manage the concentration of $H_2O$, $O_2$ and $CO_2$ within the package while in transit and storage. To avoid triggering an unwanted anaerobic metabolism event some $O_2$ should be maintained in the modified or controlled atmosphere such that the produce can undergo normal respiration. Under most modified or controlled atmosphere conditions a mole fraction of $O_2$ of not less than 1-5% is used (Zagory, et al. Food Technology 42 (9) 70-77) and so the mole fraction of oxygen gas in a controlled or modified atmosphere should always exceed that of the ethylene present in the gas.

While maintaining produce at low temperature and in a modified (or controlled) atmosphere can reduce ethylene metabolism, it does not eliminate the production of the gas. Active agents capable of eliminating any ethylene generated during shipping and storage are therefore beneficial to prevent ethylene from accumulating to concentrations which can be harmful to the quality of the produce. Catalytic combustion systems are an ideal solution to the problem of removing ethylene from both ambient and refrigerated produce shipping and storage systems because, unlike ethylene adsorbents comprising activated carbons and zeolite molecular sieves or ethylene oxidizing agents such as potassium permanganate, the catalyst is not consumed in the process of removing ethylene from air and thus will not need to be frequently replaced.

Catalytic combustion using a heterogeneous catalyst relies on creating a compound that has a suitably strong affinity for the target species. Before reaction can take place the catalyst first needs to adsorb the target gas species; a process which simultaneously binds the target molecule to the surface of the solid and destabilizes the bonding that holds the molecule together. When the adsorbed molecule is destabilized, adsorbed molecular oxygen can migrate from the surface of the catalyst to react with the adsorbed carbon-containing moieties or $O_2$ may impinge on the adsorbed species from the gas phase (Principles and Practice of Heterogeneous Catalysis. Second Edition eds. J. M. Thomas and W. J. Thomas. Wiley-VCH, 2015). The net result of either mechanism is that carbon-carbon bonds are broken and carbon-oxygen bonds are formed. The efficiency and effectiveness of a combustion catalyst will be dictated by how strongly and selectively it can adsorb the target species and how easily it can release the products of reaction; each of these sequential processes typically taking place under the same reaction conditions. The function of a catalyst is generally enhanced at higher temperatures as catalysts display Arrhenius behaviour which makes their reaction rate exponentially dependent on temperature. This exponential dependence makes catalytic combustion at ambient and sub-ambient temperatures challenging. While suitable catalytic activity may be measured at 200° C., the catalyst may not display any measurable activity at a reaction temperature of 30° C. The temperature dependence of any given catalyst will be unique to its composition.

When a stream containing a VOC (including related compounds such as ethylene, CO, and formaldehyde) is comprised of ambient air, then water vapour is likely to exist as an additional, significant component in the gas stream. The water vapour content of a gas stream is variable and the maximum amount of water vapour that can be present is dependent on the temperature and pressure of the gas stream. When the maximal amount of water vapour is reached, the gas is considered to be saturated with water vapour. Lesser amounts of water vapour are, of course, possible and the amount of water vapour in a gas stream is generally expressed in terms of relative humidity (RH). Relative humidity is defined as the ratio (expressed as a percentage) of the amount of water vapour present in the gas divided by the amount of water vapour needed to saturate the gas at the same temperature and pressure. When the temperature of a gas stream containing a fixed quantity of water vapour is raised isobarically then the effective relative humidity of the gas stream will be changed. Air that is 70% RH at 30° C. will have its relative humidity reduced to only 0.2% RH when the stream is heated to 200° C. because the saturation pressure of the gas rises from 0.0425 bar at 30° C. to 15.5 bar at 200° C. Thus by heating a catalyst bed to temperatures greater than 200° C. the effective relative humidity of the gas passed over the catalyst can be significantly decreased.

The catalytic combustion of hydrocarbons is complicated by the presence of water vapour. The presence of 2 vol % water vapour (equivalent to 85% RH at 20° C.) in a stream containing benzene is known to have a suppressing effect on the activity of a $Pt/TiO_2$ combustion catalyst but the effect can be largely overcome by operating at temperatures of 200° C. and above (Liotta, L F. Applied Catalysis B: Environmental 100 (2010) 403-412). The effect of an equal amount of water vapour on the same catalyst for the catalytic combustion of ethyl acetate was more pronounced but full recovery of the catalyst's activity could be realized by increasing the catalysis temperature by about 50° C. to 300° C. The reasons behind this suppression were contemplated but no definitive mechanism was proposed. Irrespective of the details of any proposed mechanism, the presence of water vapour serves to reduce the activity and/or stability of the combustion catalyst. Thus to maximize the stability and activity of a combustion catalyst in the presence of water vapour the combustion catalyst can be heated to a temperature that mitigates the influence of water vapour or the combustion catalyst needs to be formulated to be tolerant to relevant levels of water vapour. Catalytic combustion of dilute components in humid streams at temperatures below 200° C. is difficult to accomplish because lower reaction temperatures do not favour catalyst activity and the presence of a significant quantity of water vapour in the stream can interfere with catalyst function.

Wojciechowski in U.S. Pat. No. 4,331,693 titled "Method for Storage of Horticultural Products in Freshness" details the preparation of a catalyst stated to be particularly suitable for the catalytic combustion of ethylene. The catalyst comprises platinum supported on alumina and was prepared by impregnating a porous alumina support with a solution containing 0.05 to 0.5 wt % chloroplatinic acid. To remove trace amounts of ethylene from air, the catalyst bed was maintained at a temperature of at least 200° C. for a period of 5 days. The exhaust stream of the catalytic combustor was returned to ambient using an external heat exchanger to avoid escalating the temperature in a sealed fruit chamber. The efficacy of the catalyst for removing ethylene from the recirculated atmosphere around the sealed quantity of fruit was gauged by assessing the quality the treated fruit versus an untreated, control batch. The humidity of the ethylene-containing air stream was not measured but such catalysis temperatures are sufficiently high to largely overcome the influence of any amount of moisture contributed by fruit respiration to the air stream.

For fresh produce applications, the need to recirculate the treated (exhaust) air from the catalytic combustor back into the storage environment naturally restricts the exhaust temperature of a catalytic combustion system; a situation which adds complexity and cost to the system. High temperature catalytic combustion systems also require a great deal of energy to heat the catalyst beds but many shipping and storage applications lack sufficient power to drive such devices. These restrictions have driven catalyst development toward compositions capable of reacting ethylene at lower temperatures.

Japanese patent 2012-081458 by Haruta titled "Catalyst Composition for Catalytic Combustion Reaction of Ethylene and Methods for Decomposing Ethylene by Using the Same" details a series of catalysts formulated using Au, Pd, Ir, Pt and Au/Pt mixtures using a range of metal oxide supports. The most active catalyst was a Au/Pt—$Al_2O_3$ catalyst containing 0.5 wt % Au and 5 wt % Pt. This catalyst was capable of converting half of the ethylene in the dry air stream at 47° C. (0.17% ethylene, balance synthetic air). The authors did not humidify the test gas and all tests were carried out using dry gas.

A study by Yasuda, et al (Bull. Chem. Soc. Jpn. Vol 85, No. 4, 522-526 (2012)) titled "Low-Temperature Complete Combustion of Volatile Organic Compounds over Novel Pt/$CeO_2$—$ZrO_2$—$SnO_2$/$Al_2O_3$ Catalysts" details the preparation and characterization of the catalyst named in the title. Catalyst formulations were tested dynamically using dry gas containing 1 vol % ethylene by raising the temperature and monitoring the amount of ethylene in the product stream. Other metal mixtures were tried but the authors demonstrate that the title formulation, containing 5 wt % Pt, had the highest activity. The authors did not humidify the test gas and all tests were carried out using dry gas.

In a study by Jiang et. al. (Angewandte Chemi Int. Ed. 2013, 52, 6265-6268) titled "Low-Temperature Oxidation of Ethylene over Platinum Nanoparticles Supported on Mesoporous Silica", the authors detail a series of precious metal-loaded materials based on the mesoporous silicate MCM-41. The authors tested a 1% Pt-MCM-41 catalyst over an extended period of time at 25 and 0° C. using dry test gas containing 50 ppmv ethylene. While the removal efficiency of ethylene remained constant at 25° C. for 12 hours, the catalyst efficiency drops after only 2 hours at 0° C. The authors assign this decrease to water accumulation on the surface of the catalyst and demonstrate that the initial activity is restored only if the catalyst is reactivated. The authors did not humidify the test gases and the only water present in the system would be the result of the catalytic combustion of the 50 ppmv ethylene in the test gas stream.

A report by Li, et al (Environ Sci. Technol. 2008, 42, 8947-8951) titled "Efficient Elimination of Trace Ethylene over Nano-Gold Catalyst under Ambient Conditions" details a material comprising gold precipitated on cobalt oxide. The authors used test gases having different concentrations of ethylene to gauge the stability of their catalysts over a period of 60 minutes. The 4% Au—$Co_3O_4$ catalyst was shown to be able to convert ethylene at concentrations between 5-1050 ppmv at 50° C. The performance of the selected catalyst was, however, only stable for 60 minutes using an ethylene feed of 5 ppmv. At 50 ppm and 1050 ppmv the activity of the catalyst decreases immediately and progressively over the course of 60 minutes; the rapidity of decline being proportional to the ethylene concentration in the feed gas. The authors did not humidify the test gas and so all tests were carried out using dry gas.

A study published by Ma, et al (J. Am. Chem. Soc. 2010, 132, 2608-2613) titled "Mesoporous $Co_3O_4$ and Au/$Co_3O_4$ Catalysts for Low-Temperature Oxidation of Trace Ethylene" details the precise steps required to prepare specific morphologies of cobalt oxide with and without the presence of gold nanoparticles. The authors provide few details associated with their test protocol. A gain of 2.5 times over the plain substrate is achieved by including gold nanoparticles and the authors report an ethylene conversion, at 0° C., of 76%. The study does not provide the necessary details to understand how the experiments were conducted nor how the conversion values were calculated. The authors did not humidify the test gas and all tests were carried out using dry gas.

In all of the prior art above, catalytic combustion of ethylene was accomplished either at high temperature (200° C. or above) or at lower temperatures using gases that were not humidified. No results were disclosed nor discussion presented for catalytic combustion in the presence of humidity at temperatures below 200° C.

The present invention addresses the need for providing adequate catalytic combustion activity in low temperature, humid conditions. In addition, the invention provides other related benefits as will be evident from the following disclosure.

SUMMARY

It has been discovered that certain selected catalyst compositions can be acceptable for use in the catalytic combustion of gaseous species in low temperature, humid conditions. The catalyst compositions provide adequate rates of catalytic combustion and, importantly, they remain active when exposed to the species in the presence of elevated levels of water vapour and at relatively low temperatures. Novel desiccant-coupled catalytic combustion processes and systems are also disclosed.

Specifically, a method for the catalytic combustion of a gaseous species comprises: obtaining a combustion catalyst composition comprising an amount of a precious metal supported on an ion-exchangeable alkali metal titanate substrate; and exposing the species to the combustion catalyst composition in the presence of an oxygen containing gas and water vapour at a catalysis temperature below 200° C. and at a relative humidity above 0.5%, whereby the species is combusted with the oxygen at the combustion catalyst composition.

The combustion catalyst composition step can comprise obtaining an ion-exchangeable alkali metal titanate; and ion exchanging the alkali metal titanate with the amount of the precious metal.

The gaseous species can be an unsaturated hydrocarbon, an aldehyde, or carbon monoxide, for instance ethylene, formaldehyde, or carbon monoxide.

When obtaining the ion-exchangeable alkali metal titanate by ion exchanging the alkali metal titanate with the amount of the precious metal, the method can comprise preparing the alkali metal titanate by the hydrothermal treatment of a mixture comprising an alkali metal hydroxide and a source of titania. For instance, the alkali metal titanate can be sodium titanate, and the alkali metal titanate can have an cation exchange capacity greater than 2 meq/g.

The precious metal can be selected from the group consisting of platinum, palladium, gold and silver, and the method can comprise ion exchanging the alkali metal titanate with an amount of an additional precious metal. Further the method can comprise ion exchanging the alkali metal titanate with an amount of an additional transition metal, for instance zinc, tin, or cobalt.

Exemplary combustion catalysts comprise Pt, Pt—Zn, Pt—Sn, Au, Pt—Pd—Sn, Pd, Pd—Zn, Pd—Sn, or Pd—Zn—Sn.

In an exemplary combustion catalyst composition, the amount of precious metal can be up to 7% of the weight of the combustion catalyst composition. Where present, the amount of additional transition metal in an exemplary combustion catalyst can be up to 10% of the weight of the combustion catalyst composition.

When the gaseous species is ethylene, the method can be effective when the concentration of the ethylene species is less than 2.7% by volume, notably even less than 1000 ppmv, and even more notably less than about 50 ppmv. The oxygen containing gas used can be air.

The method can be accomplished at a catalysis temperature below 100° C., and particularly below 30° C. Further, the method can be accomplished at a relative humidity above 5% RH, notably even above about 35% RH, and even more notably above about 90% RH.

In the inventive method and depending on the composition involved, after the obtaining step, the combustion catalyst composition may optionally be activated at a temperature above 350° C. Alternatively, again depending on the composition involved, after the obtaining step, the combustion catalyst composition may optionally be activated at a temperature below 150° C.

An advantage of the invention is that the combustion catalyst composition remains essentially stable while exposing the species to the combustion catalyst composition in the presence of water vapour.

A general method for carrying out catalytic combustion of a gaseous species has also been developed. The general method comprises desiccant-coupled catalytic combustion and can be used in the aforementioned methods in the step of exposing the species to the combustion catalyst composition using a desiccant-coupled catalytic combustion system. Further, the general method may be applied in situations in which the catalytic combustion is photocatalytic combustion.

A general system for accomplishing desiccant-coupled catalytic combustion comprises a first amount of desiccant, a catalyst composition, a second amount of desiccant, an inlet for a feed stream, an outlet to atmosphere, and fluidic hardware. The fluidic hardware is configured to alternatively direct the feed stream either into the inlet, through the first desiccant amount, through the catalyst composition, through the second desiccant amount, and out the outlet, or into the inlet, through the second desiccant amount, through the catalyst composition, through the first desiccant amount, and out the outlet. Such a system is particularly suitable for use with one of the aforementioned combustion catalyst compositions, namely one comprising an amount of a precious metal supported on an ion-exchangeable alkali metal titanate substrate.

In one embodiment, the desiccant-coupled catalytic combustion system comprises, a packed bed with two ends, and first and second switching valves. The packed bed comprises a first desiccant layer comprising the first desiccant amount at a first end of the packed bed, a second desiccant layer comprising the second desiccant amount at the second end of the packed bed, and a catalyst composition layer comprising the catalyst composition in between the first and second desiccant layers. The first switching valve is connected to the first end of the packed bed and is switchable such that the first end of the packed bed is connected to either the inlet for a feed stream or to the outlet to atmosphere. In a like manner, the second switching valve is connected to the second end of the packed bed and is switchable such that the second end of the packed bed is connected to either the inlet for a feed stream or to the outlet to atmosphere. In such embodiments, the first amount of desiccant and the second amount of desiccant can comprise the same material or alternatively different desiccant materials.

In another embodiment, the desiccant-coupled catalytic combustion system of claim 30 comprises a housing comprising a feed port and an exhaust port in which the feed port and the exhaust port are the inlet for the feed stream and the outlet to atmosphere respectively, a structured bed within the housing, first and second baffles, and a motor for rotating the structured bed. The structured bed comprises a desiccant side comprising both the first amount of desiccant and the second amount of desiccant on a first side of the structured bed and a catalyst composition side comprising the catalyst composition on the second side of the structured bed. Further, the structured bed is rotatable about an axis, the desiccant side of the structured bed faces the feed port and the exhaust port, and the perimeter of the structured bed is sealingly and slidingly engaged to the inside of the housing. The first baffle is sealingly and slidingly engaged to the desiccant side of the structured bed and in addition is sealingly engaged to the housing so as to divide the desiccant side into a section connected to the feed port and a section connected to the exhaust port and so as to separate the feed port side section from the exhaust port section. The second baffle located opposite to the first baffle and is sealingly and slidingly engaged to the catalyst composition side of the structured bed. In addition, the second baffle is sealingly engaged to the housing so as to divide the catalyst composition side into sections corresponding to the desiccant side sections and so as to separate the corresponding sections except near the end of the housing opposite the catalyst composition side. In such embodiments, the structured bed can advantageously be wheel-shaped.

DETAILED DESCRIPTION

Figure 1:
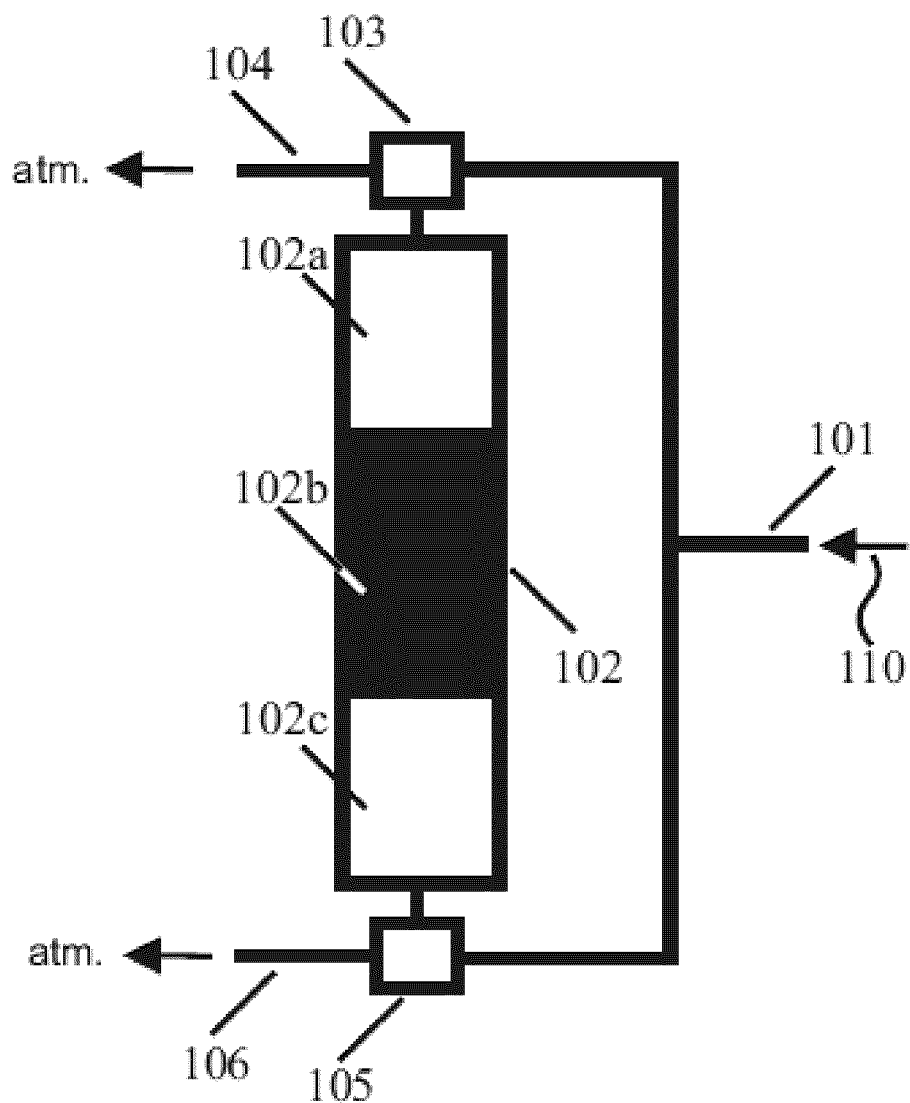
FIG. 1 shows a schematic of a packed bed DCC system of the invention.

Herein the term "desiccant-coupled catalytic combustion" (DCC) is used to refer to a process which combines at least partial desiccation and at least partial catalysis such that both desiccation and catalysis are taking place at the same time. However the desiccation and catalysis may take place in different, distinct zones. A "desiccant-coupled catalytic combustion system" is a system in which DCC occurs.

The prior art has demonstrated that, by heating a catalyst bed to upwards of 200° C., the trace amounts of organic compounds in humidified air can effectively be removed via catalytic combustion. The use of such elevated temperatures favours high catalyst activity and assists in overcoming the deleterious effect water has on catalyst activity. When such catalyst conditions are used in an enclosed environment where the treated air is returned to the same enclosed environment it is important to reduce, as much as possible, the exhaust temperature of the catalyst bed to avoid unwanted temperature escalation. In this regard, the removal of trace amounts of ethylene, carbon monoxide, and formaldehyde share several common attributes. The presence of the contaminant generally occurs within an enclosed environment. Furthermore, power may not be present to drive a high temperature catalyst system. And it is generally preferred, in all cases, to have the exhaust air from the catalytic combustor returned at or near the same temperature and humidity as it entered the catalytic combustor. These criteria can desirably be met using catalysts that require minimal or no heating to facilitate the catalyst combustion of the target species.

The removal, through catalytic combustion, of ethylene from the atmosphere around fruits, vegetables, and cut flowers is particularly challenging because, in most cases, the atmosphere around such commodities is refrigerated and maintained at a high RH to preserve produce freshness. The catalytic combustion system used to remove ethylene from such environments can be dependent on the requirements of the applications. Stationary storage applications have the benefit of access to electrical power and can take advantage of that power to drive high temperature catalytic combustors and high power air conditioning systems to maintain the temperature of the fruits and associated produce. Advantages could be brought to such systems by reducing the catalyst bed temperature and thus the costs associated with operating the system. Significant advantages could also be brought by operating the catalyst bed at the ambient temperature of the storage room since the gas stream would not need to be heated. Enclosed or sealed packaging applications are the most challenging application for catalytic combustion because the atmosphere around the produce is not in effective fluid communication with the environment that surrounds the package. Enclosed or sealed packaging applications thus require a passive catalytic combustion system to be integrated directly into the package. A successful catalyst would need to have an acceptable level of activity at lower temperatures and an ability to maintain that activity in the presence of significant levels of water vapour.

The effect ethylene has on fruit metabolism can be used to artificially ripen green fruit. So called ripening rooms are environmentally controlled chambers used maintain chilled produce at high relative humidity and expose them to relatively high (100-1000 ppmv) concentrations of ethylene. The high level of ethylene in the synthetic air mixture provokes an immediate metabolic response from the fruit that initiates ripening. As it ripens, the fruit produces additional quantities of ethylene which can raise ethylene concentrations in the room above the LEL; a situation that is presents severe safety hazards. Venting some of the atmosphere in the room to reduce the ethylene concentration changes the environmental conditions in the room since chilled, humid air is vented and the ambient air used to make it up is unchilled. Rapid buildup of ethylene is required to initiate uniform ripening but when the artificial ripening of the produce is complete it is desirable to rapidly remove ethylene from the room to halt the process. Venting the entirety of the ethylene-contaminated air in the vicinity of ethylene sensitive plants and produce can create unwanted damage. Ripening rooms could benefit from the integration of a catalytic combustion system which preserves the environment (temperature and humidity) around the produce while selectively removing ethylene. The catalytic combustion system could be operated intermittently to prevent the ethylene from exceeding some specified fraction of the LEL and/or the catalytic combustion system could be operated continuously to eliminate the ethylene from the ripening room without requiring the atmosphere in the room to be lost through venting. A catalytic combustion system operating in such an environment would need to accommodate an initial surge of high concentration ethylene after which the ethylene concentration should taper as the room is progressively reduced in ethylene.

The need to remove CO from air is driven by its inherent toxicity toward human health. Because the air being treated is generally used for respiration, the temperature and humidity characteristics of the ambient air are sought to be preserved in the treated gas. A variety of catalytic combustion systems can be implemented depending on the environment from which the CO is to be removed. For applications where CO is being removed from air which is being fed to a passenger compartment of a vehicle or craft it is possible to take advantage of the vehicles power system to drive a process whereby the air being introduced into the passenger compartment is first forced through a catalytic combustion system. Such systems might take advantage of surplus engine heat or use the vehicles or crafts electrical system in conjunction with resistive heaters to heat the catalyst bed to enhance catalyst activity. For the protection of individuals outside of a vehicle or craft, gas masks (respirators) using cartridges and/or filters are commonly used as an alternative to self-contained breathing apparatus. A catalyst introduced into the intake cartridge or filter of the respirator could combust CO as air is drawn through the element. Respirator applications would, ideally, require the catalyst to accommodate the full load of humidity at the ambient temperature whilst still retaining acceptable activity. Such catalysts as could beneficially be used for respirators could also be used to protect the cabin atmosphere of a vehicle or craft in lieu of more complex systems requiring heat and/or power.

Formaldehyde accumulation can be an issue in buildings where construction materials are present that outgas the chemical. Without any removal mechanism, the pollutant builds up over time as the air is continuously recirculated through the building. Catalytic combustion systems for the removal of formaldehyde could take advantage of power present in the building to drive a high temperature catalytic combustion system. The power requirements for heating the volumes of air involved, however, is prohibitive even if the catalysis temperature was reduced below 200° C. A process whereby the catalyst bed was operated at the ambient temperature would be more economical. Such a solution would require catalysts that had acceptable activity at low temperatures. Most advantageously, formaldehyde combustion would be accomplished by integrating some element including the combustion catalyst into the existing air circulation system for the building. The catalyst element should be capable of combusting formaldehyde as the building air is drawn across the element containing the catalyst.

It has been discovered that certain selected catalyst compositions can be acceptable for use in the catalytic combustion of gaseous species in low temperature, humid conditions. The catalyst compositions provide adequate rates of catalytic combustion and, importantly, they remain active when exposed to the species in the presence of elevated levels of water vapour and at temperatures below 200° C. and particularly below 30° C.

The combustion catalyst compositions of the present invention can be prepared by supporting precious metals or mixtures of precious metals and transition metals onto an alkali metal titanate. An alkali metal titanate is an ideal catalyst support due to its combination of high surface area, ion-exchange capability and capacity, and high thermal stability. Herein, an alkali metal titanate is a material which can exchange cations onto the surface of the solid in exchange for the native, alkali metal cations. It is the ability of the alkali metal titanate material to undergo ion exchange at ambient temperature which differentiates an alkali metal titanate from other, unrelated materials, such as barium titanate, which wholly lack this property.

While a range of related materials has been reported in the art, the material subject to the most investigation is sodium titanate; also called hydrous sodium titanate or sodium hydrous titanate. Sodium titanate is exemplary of the alkali metal titanates of the present invention. Sodium titanate is formed by combining a source of alkali—typically sodium hydroxide—with a source of titanium. The source of titanium can be an alkoxy compound such as titanium isopropoxide (U.S. Pat. Nos. 4,511,455; 5,177,045; 5,461,022; 4,929,582) or it can be a source of titanium oxide (U.S. Pat. Nos. 8,580,226; 4,853,202; Sun, et al. Chem. Eur. J. 2003, 9, 2229-2238). In the former cases, the sodium titanate is formed through a precipitation process which can yield X-ray amorphous material while in the latter cases a hydrothermal process is used to convert at least part of the solid titania into sodium titanate and yields a product that displays an identifiable X-ray diffraction pattern. Either process may include additives in the synthesis mixture to promote the formation of specific characteristics in the sodium titanate product. The cation exchange capacity (CEC) of a sodium titanate is typically expressed in terms of milliequivalents per gram of material (meq/g). An equivalent is defined as the number of moles of cations exchanged onto the surface of the titanate multiplied by the valence of those cations. A milliequivalent is simply the product of the number of equivalents multiplied by one thousand. In practice, the cation exchange capacity of a sodium titanate can range (on an as-synthesized basis) between approximately 2 and 6 depending on the quality of material, the cation selected, and the ion exchange conditions used (Sun, et al. Chem. Eur. J. 2003, 9, 2229-2238; Stephens et al., Ind. Eng. Chem. Prod. Res. Dev. 1985, 24, 15-19; Bunker et al Chapter 8, Characterization and Catalyst Development, Bradley et al Editor. ACS Symposium Series Vol 411, 1989).

The choice of precious metal in selecting a combustion catalyst composition is not limiting and platinum, palladium, silver, and gold on a wide range of solid supports have all been shown to be active toward catalytic oxidation reactions. Compositions containing platinum are common for VOC removal applications although palladium and gold-based catalysts have also been broadly explored for catalytic combustion (Liotta, L F. Applied Catalysis B: Environmental 100 (2010) 403-412; Huang, et. al. Catal. Sci. Technol. 2015, 5, 2649-2669; Spivey, H. Ind. Eng. Chem. Res. 1987, 26, 2165-2180; van de Beld, et. al. Chemical Engineering and Processing 34 (1995) 469-478; Xanthopoulou, et. al. Eurasian Chemico-Technological Journal 17 (2015) 17-32). The use of co-metals in catalyst design is common and bi-metallic and tri-metallic catalyst systems containing both precious metals and transition metals have been applied to high temperature automotive exhaust catalytic combustion applications (Liotta, L F. Applied Catalysis B: Environmental 100 (2010) 403-412; Spivey, H. Ind. Eng. Chem. Res. 1987, 26, 2165-2180), high temperature hydrogenation/dehydrogenation reactions (Yu, et al. AICHE J. 61: 4367-4376, 2015; Masai, et. al. J. Catal. 50, 419-428 (1977); Burch, R. J. Catal. 71, 348-359 (1981); Freakley, et. al. Science, February 2016 Vol 351 Issue 6276) as well as other selective catalytic oxidation reactions (Du, et. al. ACS Catal. 2012, 2, 287-297; Bond, et. al. JCS Chem. Comm. 1975 796-797). The function of the co-metal may not be precisely known although it has been identified that the co-metal can help prevent the precious metal from sintering at high temperatures or may alloy with the precious metal to alter the electronic environment around the precious metal. Co-metals have also been implicated in facilitating oxygen transport across the surface of the support. Prior art catalyst studies have indicated that certain, lower cost, metals such as zinc and tin, are compatible as co-metals when combined with platinum or palladium. Gold, by contrast, appears to interact positively with cobalt, iron, and nickel. While general observations and inferences can be drawn from the prior art, the selection of precious metal(s) and transition metal(s), their absolute and relative quantities on a support, and the manner in which the catalyst is prepared for reaction remains a matter of discovery for each composition, each type of reaction, and for each set of conditions within a class of reaction.

In the preparation of metal-loaded titanate catalysts it is advantageous, but not essential, to select reagents where the metal salt, in aqueous solution, dissociates to yield a metal cation. Such reagents allow the metals to be deposited onto the surface of the titanate support via an ion-exchange process. Such reagents include tetraammineplatinum(II) nitrate, palladium(II) nitrate, and gold (III) chloride. Tin (II) chloride dihydrate, zinc (II) nitrate, and cobalt (II) chloride also meet this requirement as does Ag(I) nitrate. The reagents may be either anhydrous or hydrated in their crystalline form. Reagent salts that yield metal cations in solution makes it facile to change both the absolute and relative quantities of precious metal and co-metal on the titanate support simply by altering the amount of metal salt dissolved in the ion exchange solution.

It is also possible to formulate titanate catalysts through the process of incipient wetness. The process of preparing a bimetallic titanate catalyst through incipient wetness is provided by Yu, et al. (AICHE J. 61: 4367-4376, 2015). The advantage of using incipient wetness is that reagents can be used where the salt does not dissociate in water to yield a metal cation. The use of incipient wetness impregnation also, advantageously, eliminates filtering as a processing step. It is also possible to prepare titanate catalysts through the process of solid-state ion exchange. The process of solid-state ion exchange can occur when the titanate support is intimately mixed, blended, or ground with a metal salt or salts. When the affinity of the titanate is greater for the metal ion in the salt compared to the ion on the surface of the titanate then a progressive replacement of one for the other can occur through a surface diffusion phenomenon. The process of solid-state ion exchange is typically facilitated by elevated temperatures though the process can occur at temperatures less than half the melting point of the salt; albeit on a longer time-scale.

The implementation of such inventive catalysts for VOC removal can be dictated by the catalyst performance under a desired set of conditions and/or by the needs and limitations of the application. The application of combustion catalysts can be arbitrarily divided into high and low temperature domains where high temperatures are above 30° C. and low temperatures are at or below 30° C. Such a distinction is drawn to reflect a reasonable upper limit on unregulated, atmospheric temperature. As humidity is almost ubiquitous in applications where the presence of $C_2H_4$, CO, or $CH_2O$ is unwanted, the implementation of combustion catalysts can be further divided into applications where the RH is high (>60% RH), moderate (5-60% RH), and low (<5% RH). The most demanding applications are those that require the catalyst system to operate at low temperature and high humidity for reasons described earlier.

For applications where heating the catalyst bed is possible, it is advantageous to capture as much of the heat energy as is possible from the exhaust stream via heat exchangers. The design of catalytic combustion systems for ethylene removal is well established in the art and examples of such systems are reported in U.S. Pat. Nos. 7,214,351; 5,484,574; 5,164,168; 5,008,091; 4,506,599 as well as UK Patent application GB2,163,637. The combustion catalyst compositions of the current invention are advantageous for use in any of these systems because a wide range of the compositions maintain suitable activity at temperatures lower than 200° C. using gas which has been humidified to 100% RH at 20° C. For instance, certain compositions prepared in the following Examples show such suitable activity, e.g. particularly numbers CC9-CC11. Indeed all inventive compositions in the Examples (with the exception of CC11 which had been activated at 20° C.) demonstrated the ability to exceed the performance of a prior art 1% Pt—$Al_2O_3$ catalyst at temperatures of 150° C. and below. Pairing one of the aforementioned inventive combustion catalyst compositions with any of the prior art catalytic combustion systems would allow the catalytic combustion system to operate using less energy as a result of the lower catalyst bed temperature afforded by the inventive catalysts.

For applications where it is impractical or undesirable to heat the catalyst bed, the activity of a combustion catalyst composition should be acceptable at low temperatures. In the following Examples, inventive composition numbers CC1-CC6 display such activity although the activity of these compositions is inversely proportional to the RH. To take advantage of higher catalyst activity at lower RH, such compositions could be used in a configuration where the incoming air containing the VOC is first partially dried before being passed over the catalyst. The partial drying of the air stream can be effected through the use of a solid desiccant which has a suitable adsorption affinity for water vapour. The choice of desiccant is not limited and can be selected from silica gel, activated alumina, aluminosilicate gel, activated carbon, zeolite molecular sieve, titanosilicate molecular sieves, or mixtures thereof. Silica gel is particularly advantageous due to its high water capacity and linear adsorption profile across a wide range of RH. Desiccants have a finite adsorption capacity for water and thus need to be periodically dried (or regenerated) if the desiccant is to be used in a continuous process.

The gas containing the VOC could be partially dried in an independent desiccant system and then the partially dried stream from the outlet of the desiccant system could be directed to a bed containing the combustion catalyst composition. One of the limitations of using an independent drying system is that the fraction of gas used to regenerate the desiccant is returned directly to the atmosphere still containing the full complement of VOC present in the feed. Another limitation of an independent drying system is that the latent heat released when moisture is adsorbed on the desiccant is lost to the drying process. The enthalpy of adsorption for water on a desiccant generates an exotherm can be used, advantageously, to warm the gas. Delivering a slightly warmed, partially dried gas stream to the combustion catalyst composition can be doubly beneficial as the activity of the composition can benefit both from the increased temperature and the decreased humidity of the gas.

By combining partial desiccation and catalytic combustion into a single process, a system is considered that is able to increase catalyst activity at low temperature. Such a process is referred to as desiccant-coupled catalytic combustion (DCC) and a system based on this process is a DCC system. In general, a DCC system of the invention comprises a first amount of desiccant, a catalyst composition, a second amount of desiccant, an inlet for a feed stream, and an outlet to atmosphere. In operation, one of the desiccant amounts is adsorbing water from the incoming gas while the other desiccant amount is desorbing adsorbed water into the system exhaust. To accomplish this, fluidic hardware is provided that is configured to alternatively direct the feed stream either into the inlet, through the first desiccant amount, through the catalyst composition, through the second desiccant amount, and out the outlet, or into the inlet, through the second desiccant amount, through the catalyst composition, through the first desiccant amount, and out the outlet.

Ideally, in a DCC process, the catalyst and desiccant zones are separate and distinct layers or bands and the feed gas encounters the desiccant before passing across the catalyst. It is possible, though less advantageous, to create an admixture of desiccant and catalyst such that the desiccation and catalytic combustion take place simultaneously. Admixtures do not take full advantage of the latent heat generated by water adsorption nor does all of the catalyst benefit from gas which has been partially dried. The choice of desiccant, its quantity used, and the RH of the incoming gas will determine how much water is removed from the stream. For catalysts of the present invention it is not necessary to remove all of the moisture from a gas stream. For the purpose of enhancing catalyst function, the gas stream need not be made drier than 0.5% RH, and preferably not drier than 5% RH. In some circumstances the stream may only be dried to 15-35% RH as catalysts of the present invention have demonstrated acceptable activity at this level of humidity.

To take advantage of both partial dehydration and gas warming to enhance catalyst activity, a DCC process that utilizes a packed bed filled with alternating layers of desiccant and catalyst particles can be considered where an amount of desiccant is placed at the top of the bed and another amount of desiccant is placed at the bottom of the bed and the catalyst is placed in between. The desiccant and catalyst particles can be beads, pellets, extrudates, granules, or mixtures thereof. Such a DCC system is shown in FIG. 1 where conduits and valves connect the feed gas to both ends of bed 102 which comprises two desiccant layers 102a and 102c and single catalyst layer 102b. The process alternates the feed to each end of the bed so that the partially dry gas generated at one end of the bed is used to regenerate the moisture-laden desiccant at the other end. Throughout the DCC process, the catalyst sees partially dried gas while the exhaust streams from both ends of the bed provide VOC-depleted, cool, humid gas back to the atmosphere from which is was taken. The DCC process would work equally well using twin beds each containing a desiccant section and a catalyst section wherein the catalyst sections are fluidly coupled.

In FIG. 1, the direction of gas flow through the bed alternates depending on which step of the process it is in. The feed direction is considered to be in the downward direction in the figure while the counterfeed direction is considered to be in the upward direction in the figure. In the first step of the proposed process, feed stream 110 containing humid gas and a VOC is continuously conveyed through conduit 101. Switching valve 103 directs feed stream 110 into bed 102 while, simultaneously, switching valve 105 directs the exhaust flow from bed 102 through conduit 106 which vents to the atmosphere. As feed stream 110 containing the VOC travels through bed 102, the water in the stream is adsorbed on the desiccant in desiccant layer 102a which partially dries and warms the gas stream. The partially dried and warmed stream subsequently encounters catalyst composition in catalyst layer 102b where at least a portion of the VOC is combusted. As this dry, VOC-depleted stream travels over desiccant layer 102c, it will desorb water from desiccant therein. This action regenerates the desiccant in desiccant layer 102c and humidifies and cools the gas stream. The VOC-depleted, humid, cool stream is then vented to the atmosphere through conduit 106. In the second step of the process, the humid feed stream 110 is directed to the lower part of bed 102 by switching valve 105 while, simultaneously, switching valve 103 directs the exhaust of bed 102 to vent to atmosphere through conduit 104. In this second step, the humid counterflow stream initially encounters the desiccant in desiccant layer 102c which, having been regenerated previously, is able to adsorb at least some of the water vapour from feed stream 110. The remainder of the process repeats as described previously but in reverse. The partially dried counterflow stream then encounters the catalyst composition in catalyst layer 102b where at least a portion of the VOC is reacted. As this partially dried, VOC-depleted counterflow stream encounters the moisture laden desiccant in desiccant layer 102a, the stream desorbs at least a portion of the water and, in doing so, regenerates the desiccant and cools and humidifies the gas. This cool, humidified, VOC-depleted gas is then vented to the atmosphere through conduit 104. In this manner, a cyclical process is realized that is able to improve catalyst activity by providing partially dried gas to catalyst layer 102b while returning VOC-depleted gas at a similar temperature and RH to the atmosphere from which it was withdrawn. (Note that the DCC system shown in FIG. 1 employs two discrete switching valves 103, 105, e.g. solenoid valves, to achieve the desired alternating flow through bed 102. However, any switching valve system that can appropriately alternate the direction of flow through bed 102 may be considered for use instead. For instance, it is possible to use a suitable rotary valve or valves to accomplish the same thing. In a like manner, a series of shut-off valves that are appropriately configured and sequenced could be used instead.

A structured bed could be used in place of a packed bed (or beds) to carry out the process described above. Suitable structured beds include honeycomb or monolith structures, corrugated or pleated structures, or spirally wound laminate structures where a flow channels separate a continuous sheet of active material. The desiccant and catalyst could be coated or otherwise deposited on the structure by spray coating, wash coating, slip coating, impregnating, nip-rolling, or calendering depending on the needs and limitations of the structure. The structured bed could be made of plastic, metal, ceramic, or mixtures thereof depending on what mechanical and/or axial and longitudinal heat transfer characteristics of the structure are desired. The walls of a honeycomb or monolith structure may be porous or non-porous and may contain inert or active materials such as the application requires. Examples of active materials can be adsorbents comprising activated carbon, molecular sieves, and metal oxides such as alumina while mullite, steatite, cordierite, and kaolinite, are examples of inert materials.

Figure 2:
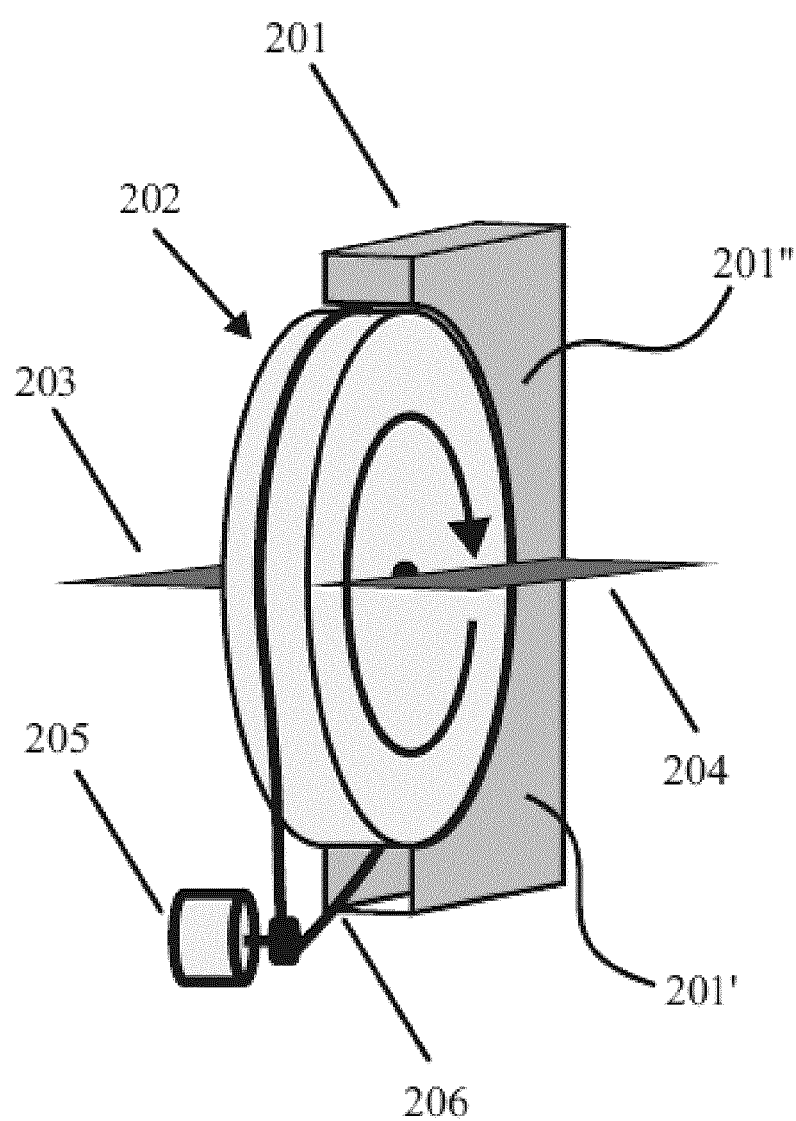
FIG. 2 shows a schematic of an alternative DCC of the invention comprising a structured bed housed in an enclosure.

The desiccant-coupled catalytic combustion (DCC) process described above for packed bed and/or structured bed embodiments can alternatively be implemented using a structured bed in a rotating wheel-shaped embodiment while retaining the same benefits as those described above for the packed bed embodiment. A cutaway schematic of an exemplary embodiment of such a DCC system is shown in FIG. 2. Wheel-shaped structured bed 202 is contained in a housing 201 (only a portion shown in FIG. 2) which encloses and seals bed 202 within it. The structured bed 202 is divided into segments (namely feed section 201' and exhaust section 201") by baffles 203 and 204 which seal against the face of structured bed 202 to prevent gas from slipping past the baffles before it is conveyed through structured bed 202. As shown, structured bed 202 is advantageously divided in half by baffles 203, 204 although additional baffles could be added to further divide structured bed 202 should the need be warranted. Variable speed motor 205 is coupled to a drive belt 206 to continuously rotate structured bed 202 about its axis (rotation direction is indicated by the arrow in FIG. 2) so that each section of structured bed 202 travels a full rotation in a period of time specified by the operator. Use of a structured bed is advantageous compared to a packed bed because a structured bed allows the process to be operated continuously without the need for switching valves to cycle the direction of gas flow through the bed. Structured beds also offer less resistance to gas flow compared to packed beds which can reduce the power needed to convey the gas through the structure.

Figure 3:
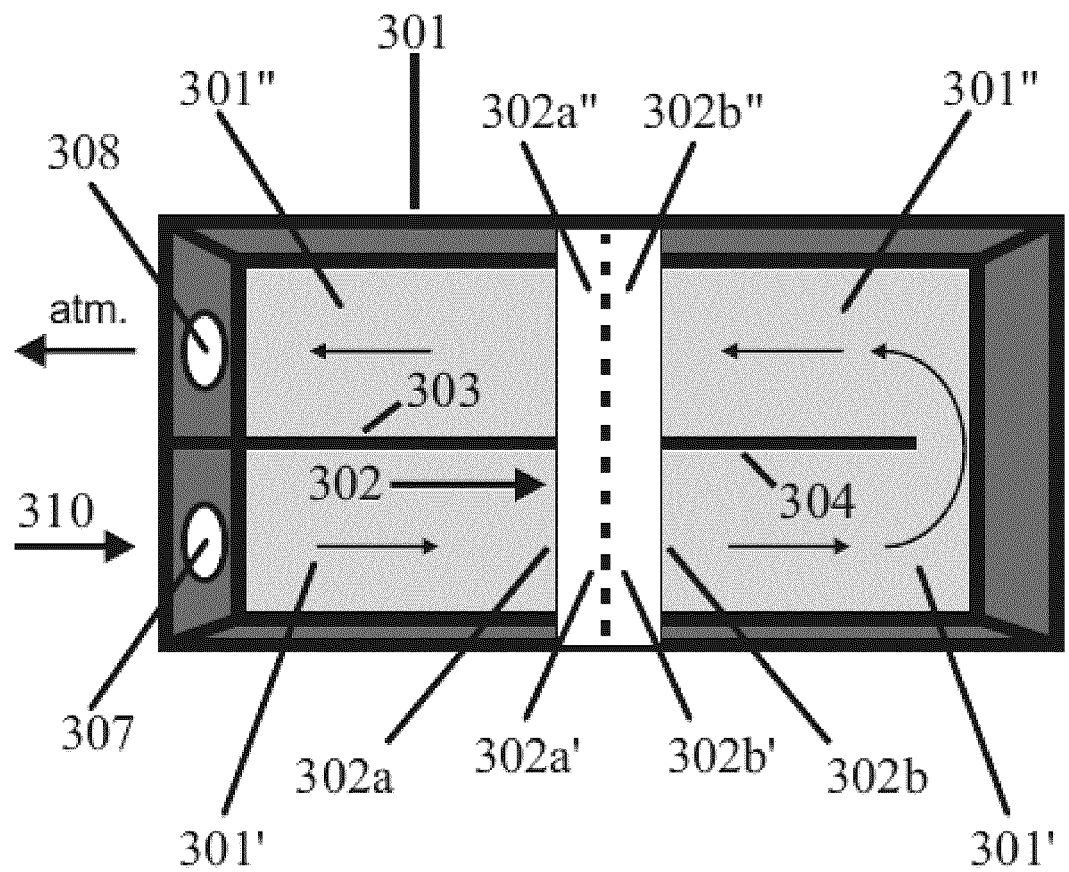
FIG. 3 shows a cutaway schematic of the structured bed DCC system of FIG. 2.

As with the packed bed DCC system of FIG. 1, the flow through the structured bed can be redirected back through the structure so that the counterflow stream exits the same face of the structured bed that the feed stream entered. Advantageously, the feed and exhaust ports can be located 180 degrees apart to allow for equal adsorption and desorption times in the bed. This is illustrated in FIG. 3 which is a cutaway side view schematic of the structured bed DCC system of FIG. 2. In FIG. 3, the radial offset between the feed and exhaust ports is 180 degrees. In FIG. 3, housing 301 is divided into feed and exhaust sections 301' and 301", respectively, by baffle 303 which seals and isolates feed port 307 from exhaust port 308. As in FIG. 2, baffle 303 also creates a seal against the face of the wheel-shaped structured bed 302 to minimize the amount of cross flow between the feed and exhaust sections of housing 301. Wheel-shaped structured bed 302 is integrated into housing 301 in such a way that the flow cannot circumvent the flow channels within structured bed 302. As shown in FIG. 3, wheel-shaped structured bed 302 is comprised of desiccant side 302a and catalyst side 302b. Desiccant side 302a at least comprises first and second amounts of desiccant in the form of a structured bed and typically the entire desiccant side 302a comprises a structured bed desiccant throughout. However, it is equally possible that sides 302a and 302b can instead be two separate wheel-shaped structured beds which separately contain the desiccant and catalyst respectively. Wheel-shaped structured bed 302 is continuously rotated about its axis parallel to its flow channels at a rate which allows for a suitable amount of adsorption of water on the desiccant in desiccant side 302a and suitable amount of combustion of the VOC on the catalyst in catalyst side 302b. Baffle 304 is used like baffle 303 to seal and isolate the feed 301' and exhaust 301" sections of housing 301 and to create a seal with the face of the structured bed 302. Baffle 304 does not run the entire length of housing 301 however, and a gap exists between the end of baffle 304 and housing 301 to allow the partially dried, VOC-depleted stream to return through structured bed 302 across catalyst side 302b, over the moisture laden desiccant, and out to atmosphere through exhaust port 308.

As illustrated by the arrows in FIG. 3, humid feed stream 310 continuously enters feed port 307 and travels through feed section 301' where it first encounters the dried desiccant 302a' of the structured bed. The partially dried gas exiting 302a' then passes across the catalyst side 302b' of the structured bed where catalytic combustion occurs. The partially-dried, VOC-reduced gas exits catalyst side 302b' and continues through feed section 301' before passing through the gap between the end of baffle 304 and housing 301. Now in the exhaust section 301" the partially dried, VOC-depleted stream encounters the catalyst side 302b" of the structured bed where, again, catalytic combustion can occur. The stream passing through 302b" subsequently enters the moisture laden desiccant 302a" whereupon the desiccant in 302a" is at least partially dried. The humidified, VOC-depleted gas exiting structured bed section 302a" enters the exhaust manifold 301" before finally returning to atmosphere through exhaust port 308. The benefits of the DCC process are equally realized using structured beds because the exhaust port 308 returns VOC-depleted, humid, cool gas back to the atmosphere. Whether using packed or structured beds, a DCC system requires some energy to operate and thus is suitable for applications where energy is available to drive the system components and to convey the gas through the bed(s).

The integration of active materials either admixed with or positioned separately within the catalyst layer in either embodiment of the DCC system can be beneficial if such an active material can accumulate ethylene from the gas stream. In situations where a VOC is present in the stream at a concentration which cannot be removed to a desired level by the catalyst present in the system then the active material or adsorbent can accumulate the unreacted VOC to prevent it from being exhausted to the atmosphere. When a feed stream containing a lower concentration of VOC is subsequently provided to the system, the adsorbent will release the adsorbed VOC over time and the desorbed VOC could then be combusted by the catalyst. Adsorbents with a strong adsorption affinity for a specified VOC are particularly advantageous as they will have a high adsorption capacity at low partial pressures of the target species. Such adsorbents will normally incorporate a transition or precious metal. Adsorbents comprised of Cu(I), Ag(I), Pd(II), and Pt(II) loaded onto a range of supports included activated carbon, zeolite molecular sieve, and metal oxides such as $Al_2O_3$ have all displayed suitable adsorptive affinity for species such as CO and ethylene. The presence of single, multiple, or mixtures of such adsorbents can be used to remove uncombusted VOC. Such a configuration is particularly beneficial for ripening rooms where the concentration of ethylene in a stream is not constant with time and where high concentrations of ethylene are used intermittently.

In situations where the energy requirements to operate a DCC system are not available then a catalyst should remain suitably active without partial drying of the gas. Catalyst composition numbers CC1 and CC4-6 in the following Examples for instance have demonstrated an ability to function both at low temperatures and at high RH. Such capability allows the combustion catalyst to be used in applications where no balance-of-plant can be accommodated to support the function of the catalyst. Applications that could take advantage of a catalyst that can catalytically combust organic contaminants at low temperature and high RH are: packages containing perishable products such as fruits, vegetables, ornamental plants or cut flowers; personal respirators; and commercial and residential heating, ventilation, and air conditioning (HVAC) systems.

For applications where the catalyst composition is to be integrated into a package containing a perishable product, the catalyst composition could be formed into granules, pellets, extrudates, or beads and enclosed in a gas-permeable (and typically hydrophobic) sachet such as is commonly used in the field of active packaging to contain desiccants, getters, oxidizers, and adsorbents. In such applications the catalyst composition is in fluid communication with the atmosphere around the products through the natural convection and diffusion of gases in the package. The catalyst composition could also be impregnated into or coated onto packaging materials such as cartons, crates, fruit trays and cell dividers. Integrating the catalyst composition into elements that support the produce is particularly advantageous. Having the ethylene generation and combustion sources in close proximity helps prevent stagnant pockets of gas that can accumulate ethylene. It would be advantageous to ensure a hydrophobic, gas permeable barrier or membrane is placed over, or bonded to, the catalyst layer to prevent wear, attrition, or fouling of the catalyst composition. Myriad such solutions are possible although the most advantageous integration of the inventive combustion catalyst compositions involve those where the items including catalyst elements are easy to remove and reuse, have a high permeability to facilitate gas transport, and are in close proximity to the produce.

For applications where a personal respirator is relied upon to remove CO the catalyst composition could be integrated into compatible cartridges or filters in such a way as to maximize the amount of gas contact with the catalyst composition without introducing undue pressure-drop across the cartridge or filter. For such applications a cartridge could be filled with beads, pellets, granules, or extrudates of catalyst composition which could be fitted between suitable baffles or filters to prevent their loss and attrition. The catalyst composition could also be coated, deposited, or impregnated into woven or non-woven fabric or felt. Catalyst composition coated on filter material could be pleated to increase the surface area of the catalyst composition in contact with the air. It would be advantageous all cases to include a particulate filter upstream of the catalyst element to prevent fouling of the catalyst section of the filter.

For applications where the catalyst composition is to be used with an existing, forced air recirculation system then the catalyst composition could be integrated into the existing air recirculation or HVAC system in such a way that the air being circulated comes into fluid communication with the catalyst composition. To achieve this, the catalyst composition could be coated, deposited, or impregnated on or into a woven or non-woven substrate. The substrate could be formed into a filter and pleated in a manner to increase the surface area exposed to the gas stream. It is similarly possible to use structured beds for such applications provided the bed does not create an undue amount of flow restriction through the system. It would be advantageous for the catalyst composition to be protected by a sacrificial filter upstream of the catalyst element to prevent the catalyst composition from becoming fouled. Such embodiments integrated into recirculating air systems could be used to remove ethylene from produce storage facilities, carbon monoxide from passenger cabins in vehicles, and formaldehyde from residential and commercial buildings.

While the preceding description was directed at certain specific catalyst types and combustion processes, those skilled in the art will appreciate that the disclosed DCC method and system may be used in other catalytic combustion applications, e.g. photocatalytic combustion applications. To do so, an appropriate light source would need to be integrated into the system for purposes of photocatalysis. For instance, a construction analogous to those disclosed in "The Viability of Photocatalysis for Air Purification", S. Hay et al., Molecules 2015, 20, 1319-1356; but adapted for present purposes may be considered. Further, several stages may be required to obtain a sufficient contact time to be effective.

The following Examples have been included to illustrate certain aspects of the invention but should not be construed as limiting in any way.

EXAMPLES

A series of inventive and comparative catalysts was prepared and tested for catalytic activity toward ethylene combustion at a variety of temperatures and humidity. It was found that the choice of precious metal, co-metal, activation temperature and relative humidity each influenced catalyst activity in a different way. A range of catalysts was discovered that, in aggregate, could address the entire range of VOC applications suggested above from high temperature catalytic combustion to low temperature catalytic combustion at high RH. It was discovered that catalyst compositions containing platinum were active at temperatures below 200° C. in gas streams containing up to 2.3 vol % water vapour (100% RH at 20° C.). It was similarly discovered that catalyst compositions containing palladium were active at low temperature operation (30° C. and below). It was also discovered that the co-metal used along with precious metals altered the behaviour of the catalysts. The activation temperature of the catalyst composition (defined as the pre-treatment temperature of the catalyst material prior to testing) had a pronounced effect on catalyst activity with the platinum formulations preferring high temperature (>500° C.) activations and the palladium compositions preferring to be activated at temperatures below 150° C.

A sodium titanate support was prepared through the hydrothermal treatment of crystalline $TiO_2$. A crystalline nano-scale $TiO_2$ powder (having a mean particle size of around 10 nm) was blended with water to make a slurry. This slurry was then added to a mixture of sodium silicate and sodium hydroxide. The mole ratio of reagents was selected such that the Ti/Si ratio was approximately 10 and the Na/Ti ratio was approximately 1.5. Water was present as an excess reagent and the $H_2O$/Ti mole ratio was over 12. The mixture was homogenized and charged into an autoclave where it was stirred and heated at a temperature between 80 to 110° C. for a period of about 24 hours. The resulting slurry containing the sodium titanate was partially neutralized using acid and then filtered and washed. The resulting filter cake was dried at 60° C. and equilibrated in air before use. The mass of titanate used to prepare a catalyst composition was based on the as-weighed mass of the substrate dried and equilibrated under the specified conditions. No adjustments were made for water adsorbed on the surface of the support.

Catalyst compositions were prepared by adding a selected quantity of sodium titanate to a quantity of water suitable to maintain a suspension when the mixture was stirred. To the agitated slurry was added an aqueous solution containing a precious metal salt and the resulting mixture was stirred for approximately one hour. The amount of metal salt dissolved in solution was calculated such that, after ion exchange, a desired loading of the metal on the titanate would be achieved. For preparations of catalyst compositions containing a co-metal, a second solution containing a transition metal salt was added to the slurry containing the titanate and the resulting mixture was allowed to stir for at least another hour. For compositions containing two or more metals it was necessary to take into account the desired loadings for each metal in the final catalyst composition so that the quantities of metal salts used could be adjusted accordingly. The suspension containing the ion-exchanged titanate was then filtered, washed with deionized water, and dried. The filter cake could be left under ambient conditions overnight to dry or it could be placed in a forced air convection oven at 60° C. Ion exchange was deemed to have been complete when the filtrate was visibly colourless. A series of energy dispersive X-ray spectroscopic measurements (EDX) was performed on the compositions to confirm that the exchange of the metals onto the surface of the sodium titanate was quantitative for the compositions reported herein. The elemental analysis of the various samples suggested the cation exchange capacity CEC of the titanate was between 2 and 3 when the residual sodium ions are taken into consideration.

A catalyst composition containing 5 wt % Pd and 10 wt % Sn was prepared by adding 1.99 g of sodium titanate to 75 mL of water. The mixture was stirred to create a suspension. To this suspension was added a solution of 0.272 g $Pd(NO_3)_2$ dissolved in 30 mL of deionized water. The resulting mixture was stirred for roughly one hour before a solution containing 0.4517 g of $SnCl_2.2H_2O$ dissolved in 30 mL of deionized water was added to the stirred mixture. The bimetallic mixture was then stirred continuously at ambient temperature for an addition hour before the cocoa-coloured suspension was filtered, washed with approximately 200 mL of deionized water, and left under ambient conditions until the filter cake was dry. The catalyst composition prepared in this fashion is referred to here as CC1.

Using these preparation methods a series of catalyst compositions has been prepared which comprise Au, Pt—Zn, Pt—Sn, Pt—Pd—Sn, Pd, Pd—Sn, Pd—Zn, and Pd—Zn—Sn. The quantity of precious and co-metals varied and the platinum loading was varied between 3 and 5 wt %, the palladium loading was varied between 3 and 7 wt %, the tin content was varied between 2 and 10 wt %, the zinc content was varied between 3 and 5 wt %. A gold composition was explored that used a loading of 4 wt % Au. Further combinations and permutations are possible though the compositions provided herein are illustrative of the benefits provided to catalytic combustion systems employing catalysts comprising precious metals supported on an ion-exchangeable titante. A comparative catalyst was purchased from a chemical supplier which comprised Pt supported on $Al_2O_3$. The comparative catalyst consisted of dark grey, 3.2 mm pellets having 1 wt % Pt. The colour of the pellets suggested that the catalyst has already been activated. The comparative catalyst is referred to as Comp. 1.

It is typical for a catalyst composition to be activated before use and the optimal activation conditions are subject to discovery for each catalyst composition. Activation may be used to remove water adsorbed on the surface of the support; the removal of which will leave the metal better exposed for reaction. Such a drying step can take place in any suitable atmosphere. An activation process may be used to decompose metal salts deposited on the surface of the catalyst. Such activation is commonly used after an incipient wetness impregnation where the non-metallic species are oxidized at high temperature and removed as gases or vapours; leaving behind the metal on the support. Such an activation process requires that the gas contain at least some oxidizing agent and so air is frequently selected as an activation gas. Activation can be used to facilitate the surface diffusion of different metal species across the surface of the support; a process which can lead to intimate, electronic interactions between metals. The atmosphere used to promote this interaction is typically air to prevent the reduction of the metals but other atmospheres could be considered depending on the needs of the catalyst and the sensitivities of the metals. Activation can also include a reduction step where a metal is exposed a stream containing a reducing gas. In such cases the activation is used to at least partially reduce the oxidation state of the metal. Whatever the activation process selected for each catalyst composition, the goal in all cases is to maximize the activity of the catalyst. In the present work the activation process for each catalyst composition was carried out in advance of the beds being conditioned in humid air prior to testing.

For catalyst compositions of the present invention a range of activation conditions was necessary to accommodate differences in catalyst chemistry. Samples that required activation temperatures greater than 350° C. were activated in air, ex situ, in a muffle furnace. Catalysts that required activation temperatures less than 350° C. were activated in air, in situ, while connected to the test system. For the platinum catalyst compositions which were heated in air to temperatures greater than 500° C., the samples were heated at 2° C./min to the desired temperature after which the sample was left isothermal for at least 15 hours. For the gold catalyst an activation temperature of 250° C. was used and a stream of pure $H_2$ was passed over the catalyst until the water concentration in the outlet out the bed returned to baseline. For palladium catalyst chemistries it was determined that an activation temperature no greater than 150° C. was optimal as beyond 150° C. the catalyst activity markedly decreased. The heating rate for catalyst compositions activated, in situ, was 5° C./min. Samples activated in situ were typically maintained under isothermal conditions for roughly one hour. The activation conditions described are representative of the conditions used and should not be construed as limiting in any way. To study the comparative catalyst under conditions comparable to the catalysts of the present invention, the Pt—$Al_2O_3$ catalyst (Comp. 1) was activated, in situ, in air at 250° C. before testing.

A test system was constructed for measuring catalyst activity. The test system was capable of delivering a variety of test gases having different compositions and humidity. The test stand was designed in such a way as to allow independent adjustment of the flow rates of dry and wet test gases to achieve, in the bed, a desired RH at a selected test temperature. Simultaneous detection of $H_2O$, $CO_2$, and $C_2H_4$ was accomplished using a mass spectrometer (also called a residual gas analyzer) as a detector. The presence of high concentrations of $N_2$ (m/z=28) in the test gas streams interfered with the trace ethylene signal (m/z=26) and, as a result, a series of measurements—detailed in a following section—was required to address this effect. The $CO_2$ signal was logged at m/z=44 while the water signal was logged at m/z=18.

All catalyst compositions were prepared for testing by using a hydraulic axial press to compress 2 g of binderless powder in a 0.75" ID cylindrical steel die with 5 tons of force. The resulting compressed disc was then crushed and sieved to 20-40 mesh. If the catalyst required high temperature activation (>350° C.) then the 20-40 mesh granules were placed in a crucible and calcined, ex situ, in a muffle furnace otherwise the granules were activated in situ. Typically, approximately 0.5 g of granules were loaded into a straight length of 0.375" outer diameter, 0.305" inner diameter, stainless steel tube connected to the test system using leak-tight compression fittings. The activated catalyst was conditioned using humidified air until the moisture level in the exhaust stream, as measured by a relative humidity sensor, was constant at the desired level. With the bed conditioned, or saturated, at a selected RH, the gas was switched from air to the test gas containing a mixture of 50 ppmv ethylene in air. The total flow rate of the test gas was set to at least 200 sccm until the ethylene signal at the exit of the bed (as measured by the mass spectrometer) was level. This condition ensured that the bed had been fully saturated with ethylene or that "breakthrough" of the ethylene was complete. With ethylene breakthrough complete, the total mass flow rate through the bed was reduced to the measurement flow (typically 25 sccm) and this new flow rate was maintained until the ethylene signal at the exit of the bed was constant. The signal value recorded by the mass spectrometer was averaged over the period of stability and the average value is referred to as the "signal". After this constant ethylene signal was achieved, the humidified test gas was directed to the bypass loop so that the ethylene signal intensity could be measured in the absence of catalyst. When a stable ethylene signal was achieved through the bypass (the "span" signal) the gas flowing through the bypass was switched to humidified, ethylene-free air and the signal at m/z=26 was collected until the signal was stable (the "zero" value). The conversion of ethylene in the test gas was then calculated using the relationship:

Conversion (%)=(1−(signal−zero)/(span−zero))×100

Figure 4:
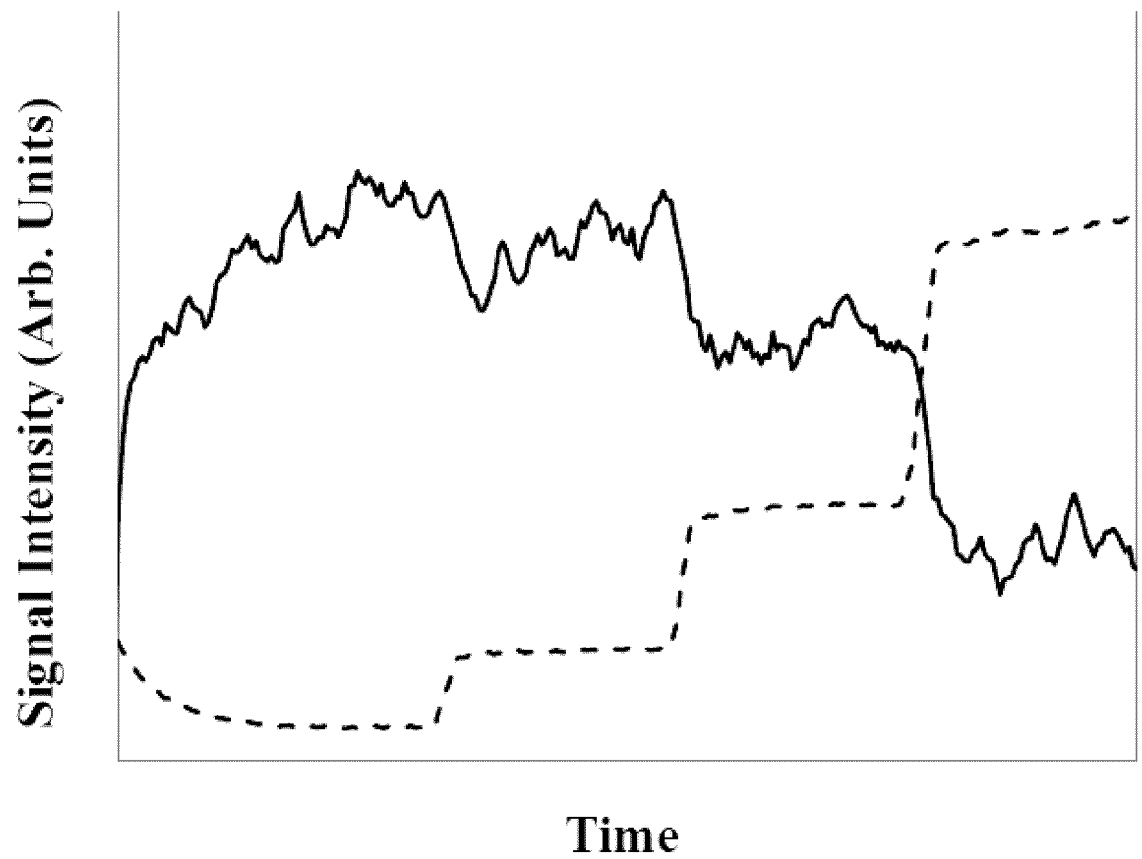
FIG. 4 shows a trace of the mass spectrometer signals for ethylene (solid line) and $CO_2$ (dashed line) as the flow rate of the test gas is sequentially decreased. Time increases from left to right. The flow rate was reduced sequentially from 200 to 100, then to 50, and finally to 25 sccm. The step changes in the $CO_2$ plot indicate when the flow rate was adjusted. CC1 was the catalyst used in the testing.

To establish that a catalyst was combusting ethylene (rather than adsorbing or partially oxidizing the molecule) the products of reaction were measured. The presence of high levels of water vapour in the test gas stream compared to the dilute (50 ppmv) fraction of ethylene renders it impractical to use the water vapour from the combustion of the ethylene as an indicator of catalytic combustion. The signal associated with $CO_2$, however, could be used as a defining indicator of catalytic combustion. The data presented in FIG. 4 relates to a bed that contained 0.443 g of 20-40 mesh granules of the sample catalyst composition CC1. The bed had previously been saturated in air at 20° C. and 35% RH. In the experiment the flow rate of the test gas was changed in order to alter the amount of time the gas spends in contact with the catalyst. The ethylene signal that was measured at the exhaust of the bed decreased in intensity as ethylene was removed from the test gas through catalytic combustion. It can be noted that the signal trace associated with ethylene was highest at a flow rate of 200 sccm. The relatively low degree of conversion at this flow rate was due to the short amount of time that the gas spent in contact with the catalyst. At 25 sccm, however, the extended contact time between the gas stream and catalyst resulted in a higher proportion of the ethylene being converted. While not possible to quantify the signals due to the presence of interfering gases and a lack of an internal standard, the trends in the ethylene data and $CO_2$ data are conclusive with respect to catalytic combustion. As the quantity of ethylene in the product stream of the bed decreased the $CO_2$ level increased concomitantly. These trends only couple when $CO_2$ is a direct product, rather than a side product, of the reaction of ethylene with the catalyst.

Figure 5:
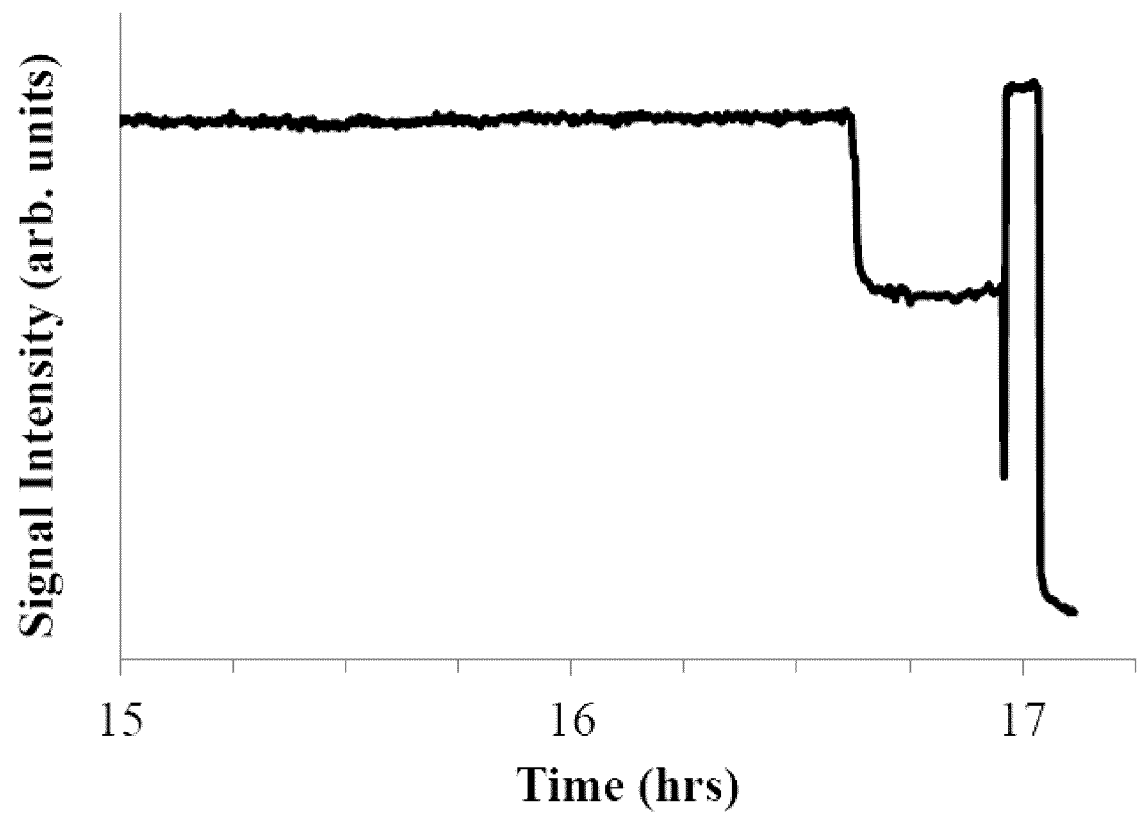
FIG. 5 shows a trace of the mass spectrometer signal for ethylene for a long time-on-stream experiment. After approximately 16.5 hours being exposed to 200 sccm of humidified test gas a sequence of changes in gas flow rate, direction, and composition was used to measure the conversion of ethylene.

The stability of the catalyst in the presence of a water vapour is important toward maintaining catalyst performance in applications where the gas being treated contains a measurable amount of humidity. Artificially high estimates of conversion can be generated if the catalyst bed is not preconditioned, or saturated, with water vapour and/or if the catalyst performance is measured at a short time-on-stream; that is, when relatively few moles of ethylene have been admitted to the catalyst bed relative to the number of moles of precious metal present in the catalyst bed. These criteria are particularly important at low experimental temperatures where water condensation on the surface of the support can be expected to interfere with catalyst function. The plot in FIG. 5 relates to an experiment that used the same bed of CC1 catalyst as in FIG. 4. The bed was again saturated in air at 20° C. and 35% RH after which the catalyst was exposed to a humidified stream of 50 ppmv ethylene in air. For greater than 16 hours the sample was subjected to a 200 sccm flow of the test gas at 20° C. and 35% RH. The catalyst activity was then assessed after approximately 16.5 hours by reducing the flow to 25 sscm. The first step change in the ethylene signal was associated with this change. The decrease in the signal was representative of the greater fraction of ethylene removed at the lower flow rate. Once a stable ethylene signal was achieved (the "signal" value), the flow of humidified test gas was directed to the bypass (at 25 sccm) so that the ethylene signal could be measured in the absence of catalyst. The second step change in the plot was related to this change. Achieving a suitably stable signal through the bypass (the "span" value), the test gas was switched from the test gas to ethylene-free air and the signal was allowed to decay to baseline (the "zero" value). The third step change in the ethylene signal was associated with this change. The obvious difference between the signal and span levels indicated that the catalyst maintained a high degree of conversion after the exposure to a significant quantity of humid ethylene.

The moles of ethylene that passed through the bed during the 16.5 hr exposure represented a molar stoichiometric ratio of 2.7 compared to the moles of palladium present in the bed. Such conditioning ensured that any potential deactivation mechanisms had ample opportunity to manifest and that the activity of the catalyst measured under such conditions should be representative of the steady-state performance of the catalyst. This exceptional catalytic stability in the presence of humidity allows the activity of the catalysts to be reliably assessed at a shorter time on stream (TOS). The TOS is defined as the length of time the catalyst was exposed to the desired flow rate of test gas at (e.g., 25 sccm) before the span and zero measurements were taken. It was deemed that when the ethylene signal in the exhaust of the bed remained unchanged for 30 minutes that the conditions in the bed were deemed to be representative of steady state. For some catalyst compositions shorter equilibration times were used and, as such, some greater degree of uncertainty may be associated with those calculated conversion values. It should be understood that the validity of the conversion values presented herein is greatly enhanced by first pre-conditioning the bed to ensure that the bed is saturated with both water and ethylene before the catalyst activity is measured.

Figure 6:
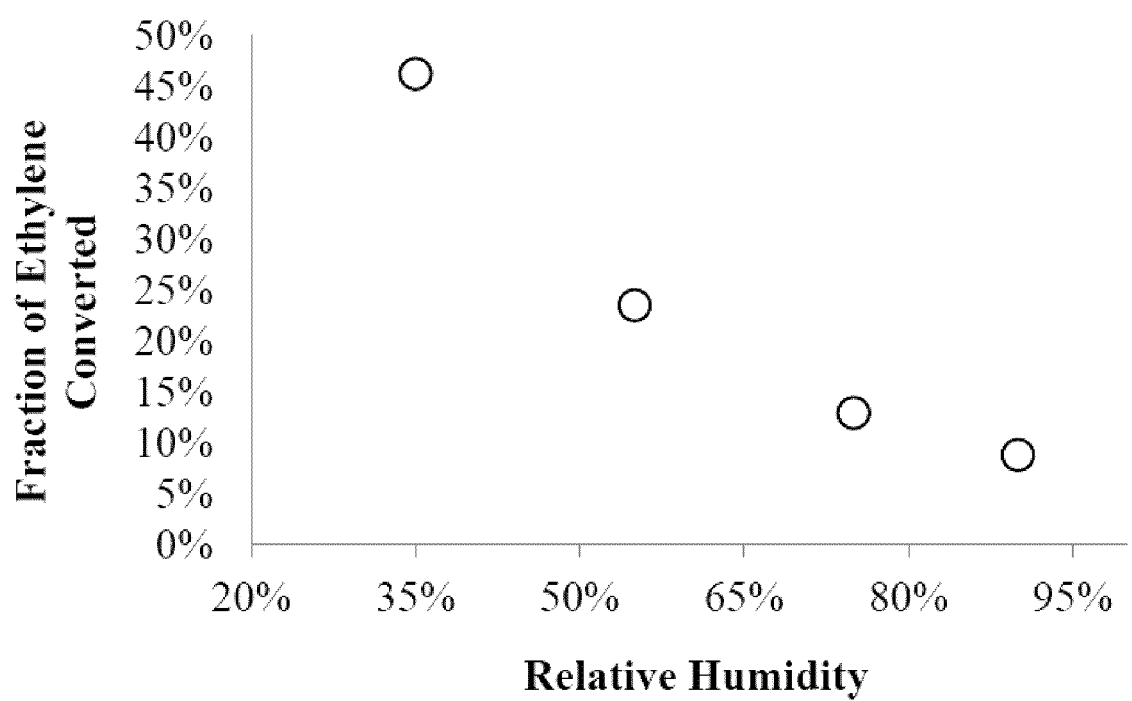
FIG. 6 shows the fraction of ethylene converted in a humidified test feed stream versus relative humidity of the stream at 20° C. for the CC1 catalyst. The flow rate used in all measurements was 25 sccm.

The performance of a catalyst composition over a range of humidity is relevant to applications where either the humidity in the air cannot be reduced or where water vapour is injected into the air to maintain a high relative humidity. FIG. 6 shows the performance of the CC1 catalyst composition over a range of relative humidity at 20° C. For each data point the bed was subjected to the same pre-conditioning procedures involving humidity and ethylene breakthrough outlined previously and the experiments were run sequentially from low to high RH. The influence of humidity is noted on the activity of the catalyst though, even at vapour conditions nearing saturation, the catalyst maintained a measurable portion of the activity it displayed at lower RH.

Additional catalyst compositions were prepared and each unique composition was given a catalyst composition (CC) number. Table 1 specifies the catalyst composition both in terms of the metals supported on the titanate as well as their absolute weight fractions. A prior art catalyst comprised of platinum supported on alumina was obtained and was given the designation Comp 1. The test results for the various catalysts are provided in Table 2 along with the results for the comparative Pt—$Al_2O_3$ catalyst. The sample mass of granules used in the testing is provided in the table as is the activation temperature for that sample. It should be noted that the activation and test conditions can vary for each unique catalyst composition (CC) so named and so the conditions are listed in Table 2. In some cases the same sample of catalyst was used for a number of tests while for other compositions a catalyst bed may have only been used only once. The flow rate of the test gas is specified so that the mass flow of ethylene through the bed used in the measurement of conversion is known. The table also specifies the time-on-stream, or TOS, for the test sequence. The TOS is an approximate number and is used, principally, to differentiate shorter duration testing from longer duration testing. Longer duration tests on beds that have been pre-saturated with water vapour and ethylene provide a strong indication of stable catalytic combustion activity. The relative humidity of the testing is also reported for each test in the table. An RH value appended with an asterisk signifies that the gas stream for that test was brought to the specified level of humidity at 20° C. and so that, for temperatures higher than 20° C., the effective RH in the bed would be lower than that stated in the table. RH values reported without an asterisk are absolute and infer that the RH in the bed was held constant as the temperature of the test was changed. The performance or activity of the catalyst is reported as the fraction of ethylene converted; a value which is reported in separate columns depending on the temperature of the test. Higher values of ethylene conversion per mole of precious metal are generally desirable.

TABLE 1

Catalyst composition number and associated metal composition

| Catalyst Composition Number | Metal Composition |
|---|---|
| CC1 | 5% Pd 10% Sn |
| CC2 | 3% Pd 5% Sn |
| CC3 | 3% Pd 5% Zn |
| CC4 | 5% Pd 6% Zn |
| CC5 | 7% Pd 5% Zn |
| CC6 | 5% Pd 3% Zn 5% Sn |
| CC7 | 4% Pd |
| CC8 | 4% Au |
| CC9 | 3% Pt 2% Sn |
| CC10 | 3% Pt 3% Zn |
| CC11 | 5% Pt 1% Sn |
| CC12 | 2% Pt 2% Pd 2% Sn |
| Comp. 1 | 1% Pt-Al2O3 |

The data in Table 2 demonstrates that palladium-based catalysts can require no activation as they are active at 20° C. directly after ion exchange. It is believed that this observation is unprecedented in the field of combustion catalysis. The observation of intrinsic activity with the palladium catalysts is in contrast to the platinum formulations that strongly benefit from an activation temperature greater than 500° C. The presence of a co-metal appears advantageous as palladium formulations containing tin, zinc, or mixtures of the two all displayed higher degrees of conversion at lower temperatures and higher RH compared to a pure palladium composition. The absolute and relative quantities of the precious metal and co-metals on the titanate appears to influence catalyst performance for the bi-metallic palladium and platinum compositions. Compositions having higher precious metal loadings were capable of converting more ethylene though this effect is confounded by a simultaneous rise in the quantity of co-metal present. In the presence of humidity, particularly above 35% RH, the palladium compositions display higher activity at lower temperatures compared to the platinum compositions while at higher temperatures the platinum-based catalysts displayed greater reactivity per mole of metal compared to the palladium formulations. The gold-loaded titanate catalyst demonstrated an ability to maintain combustion activity in a humid stream from elevated temperatures down to temperatures as low as 20° C. Catalysts containing mixtures of precious metals may be advantageous as indicated by a catalyst comprising Pt, Pd, and Sn which displays a positive response to high temperature activation but also maintains measurable catalyst activity at temperatures as low at 20° C. The comparative catalyst, Comp 1., while appreciably active at 150° C. showed only a fraction of the activity at high temperature compared to all of the inventive catalysts containing platinum (with the exception of the sample of CC11 which had seen no activation).

TABLE 2

Ethylene conversion for inventive and comparative catalyst compositions as a function of composition, temperature, and humidity

| Sample Number | Sample mass (g) | Act. Temp (° C.) | Flow Rate (sccm) | TOS (hrs) | RH | Ethylene Converted (%) Temperature (° C.) | | | | | | | |
|---|---|---|---|---|---|---|---|---|---|---|---|---|---|
| | | | | | | 150 | 100 | 80 | 60 | 40 | 20 | 10 | 5 |
| CC1 | 0.4585 | 20 | 25 | 0.5 | 35% | — | — | — | — | — | 46 | — | — |
| CC1 | 0.4585 | 20 | 25 | 0.5 | 50% | — | — | — | — | — | 35 | 19 | 17 |
| CC1 | 0.4585 | 20 | 25 | 0.5 | 55% | — | — | — | — | — | 23 | — | — |
| CC1 | 0.4585 | 20 | 25 | 0.5 | 75% | — | — | — | — | — | 13 | — | — |
| CC1 | 0.4585 | 20 | 25 | 0.5 | 90% | — | — | — | — | — | 9 | — | — |
| CC1 | 0.4585 | 20 | 25 | 0.5 | 90% | — | — | — | — | — | 7 | 6 | 3 |
| CC2 | 0.4310 | 100 | 25 | 0.2 | 35%* | 100 | 78 | 68 | 39 | 27 | 13 | — | — |
| CC2 | 0.4941 | 100 | 25 | 0.2 | 35% | — | — | — | — | — | 29 | — | — |
| CC2 | 0.4941 | 100 | 25 | 0.2 | 50% | — | — | — | — | — | 8 | — | — |
| CC2 | 0.4941 | 100 | 25 | 0.2 | 75% | — | — | — | — | — | 0 | — | — |
| CC3 | 0.4839 | 100 | 25 | 17 | 35% | — | — | — | — | — | 12 | — | — |
| CC4 | 0.5052 | 150 | 25 | 0.5 | 35% | — | — | — | — | — | 12 | 10 | 10 |
| CC4 | 0.5052 | 150 | 25 | 0.5 | 50% | — | — | — | — | — | 6 | 5 | 9 |
| CC5 | 0.4560 | 20 | 25 | 0.3 | 35% | — | — | — | — | — | 27 | 43 | 44 |
| CC5 | 0.4560 | 20 | 25 | 0.5 | 50% | — | — | — | — | — | 17 | 17 | 18 |
| CC5 | 0.4560 | 150 | 25 | 0.5 | 60% | — | — | — | — | — | 17 | 14 | — |
| CC6 | 0.4417 | 20 | 25 | 0.3 | 10% | — | — | — | — | — | 57 | — | — |
| CC6 | 0.4417 | 20 | 25 | 0.4 | 15% | — | — | — | — | — | 50 | 45 | 38 |
| CC6 | 0.4417 | 20 | 25 | 0.4 | 19% | — | — | — | — | — | — | 59 | — |
| CC6 | 0.4417 | 20 | 25 | 0.2 | 27% | — | — | — | — | — | — | — | 32 |
| CC6 | 0.4417 | 20 | 25 | 0.5 | 50% | — | — | — | — | — | 19 | 15 | 14 |
| CC7 | 0.4040 | 150 | 25 | 0.3 | 35%* | 100 | 92 | 72 | 38 | 9 | 0 | — | — |
| CC8 | 0.4770 | 250 | 25 | 0.4 | 35%* | 89 | 34 | 22 | 8 | 3 | 1 | — | — |
| CC9 | 0.4557 | 600 | 500 | 0.2 | 100%* | 85 | — | — | — | — | — | — | — |
| CC10 | 0.5631 | 600 | 500 | 0.2 | 100%* | 81 | — | — | — | — | — | — | — |
| CC10 | 0.5631 | 600 | 500 | 22 | 100%* | 72 | — | — | — | — | — | — | — |
| CC11 | 0.6488 | 20 | 25 | 0.4 | 100%* | 2 | — | — | — | — | — | — | — |
| CC11 | 0.4692 | 550 | 25 | 0.4 | 100%* | — | 49 | 3 | — | 0 | — | — | — |
| CC11 | 0.4692 | 550 | 500 | 0.5 | 100%* | 94 | — | — | — | — | — | — | — |

TABLE 2-continued

Ethylene conversion for inventive and comparative catalyst compositions as a function of composition, temperature, and humidity

| Number | Sample mass (g) | Act. Temp (° C.) | Flow Rate (sccm) | TOS (hrs) | RH | Ethylene Converted (%) Temperature (° C.) | | | | | | | |
|---|---|---|---|---|---|---|---|---|---|---|---|---|---|
| | | | | | | 150 | 100 | 80 | 60 | 40 | 20 | 10 | 5 |
| CC12 | 0.4860 | 550 | 25 | 0.5 | 35%* | 100 | 59 | 22 | 11 | 8 | 4 | — | — |
| Comp. 1 | 1.2780 | 250 | 200 | 1.8 | 100%* | 48 | — | — | — | — | — | — | — |

Some of the palladium catalyst compositions showed ethylene conversion values that, unexpectedly, did not display Arrhenius behaviour as the test temperature was reduced below 20° C. This behaviour lacks an obvious explanation but remains advantageous as it infers that catalyst activity can be preserved across a range of refrigerated temperatures without the consequential loss of activity normally expected with this change.

The results provided in Table 2 demonstrate the range of capabilities of the titanate-based combustion catalyst compositions. Through the selection of a precious metal, an optional co-metal, and developing the correct activation conditions a catalyst composition can be tuned to function at high or low temperature and at lower or higher humidity. Some catalyst compositions of the present invention are significantly more active at high temperature under fully-humidified gas compared to a prior art catalyst, while other catalyst compositions demonstrate unparalleled activity under refrigerated temperatures and at near-saturated humidity. The versatility of the combustion catalysts of the present invention allows them to address the greatest array of applications that require trace VOC contaminant removal from air.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto. As an example, desiccant-coupled catalytic combustion and systems for carrying out desiccant-coupled catalytic combustion may be used generally in other appropriate catalysis applications (e.g. in photocatalytic combustion applications) and/or with other catalysts and/or catalyst compositions than those specifically discussed herein.

The invention claimed is:

1. A method for the catalytic combustion of a gaseous species comprising:
obtaining a combustion catalyst composition comprising an amount of a precious metal supported on an ion-exchangeable alkali metal titanate substrate; and
exposing the species to the combustion catalyst composition in the presence of an oxygen containing gas and water vapour at a catalysis temperature below 200° C. and at a relative humidity above 0.5%,
whereby the species is combusted with the oxygen at the combustion catalyst composition.

2. The method of claim 1 wherein the obtaining a combustion catalyst composition step comprises:
obtaining an ion-exchangeable alkali metal titanate; and
ion exchanging the alkali metal titanate with the amount of the precious metal.

3. The method of claim 1 wherein the gaseous species is an unsaturated hydrocarbon, an aldehyde, or carbon monoxide.

4. The method of claim 3 wherein the gaseous species is ethylene, formaldehyde, or carbon monoxide.

5. The method of claim 4 wherein the gaseous species comprises ethylene.

6. The method of claim 2 comprising preparing the alkali metal titanate by the hydrothermal treatment of a mixture comprising an alkali metal hydroxide and a source of titania.

7. The method of claim 6 wherein the alkali metal titanate is sodium titanate.

8. The method of claim 6 wherein the alkali metal titanate has an ion exchange capacity greater than 2 meq/g.

9. The method of claim 1 wherein the precious metal is selected from the group consisting of platinum, palladium, gold and silver.

10. The method of claim 2 wherein the precious metal is selected from the group consisting of platinum, palladium, gold and silver and the method comprises ion exchanging the alkali metal titanate with an amount of an additional precious metal.

11. The method of claim 2 wherein the precious metal is selected from the group consisting of platinum, palladium, gold and silver and the method comprises ion exchanging the alkali metal titanate with an amount of an additional transition metal.

12. The method of claim 11 wherein the additional transition metal is zinc, tin, or cobalt.

13. The method of claim 9 wherein the combustion catalyst composition comprises Pt, Pt—Zn, Pt—Sn, Au, Pt—Pd—Sn, Pd, Pd—Zn, Pd—Sn, or Pd—Zn—Sn.

14. The method of claim 9 wherein the amount of precious metal is up to 7% of the weight of the combustion catalyst composition.

15. The method of claim 11 wherein the amount of additional transition metal in the combustion catalyst is up to 10% of the weight of the combustion catalyst composition.

16. The method of claim 5 wherein the concentration of the ethylene species is less than 2.7% by volume.

17. The method of claim 16 wherein the concentration of the ethylene species is less than 1000 ppmv.

18. The method of claim 17 wherein the concentration of the ethylene species is less than about 50 ppmv.

19. The method of claim 1 wherein the oxygen containing gas is air.

20. The method of claim 1 comprising exposing the species at a catalysis temperature below 100° C.

21. The method of claim 20 comprising exposing the species at a catalysis temperature below 30° C.

22. The method of claim 1 comprising exposing the species at a relative humidity above 5% RH.

23. The method of claim 22 comprising exposing the species at a relative humidity above about 35% RH.

24. The method of claim 23 comprising exposing the species at a relative humidity above about 90% RH.

25. The method of claim 1 comprising:
   after the obtaining step, activating the combustion catalyst composition at a temperature above 350° C.

26. The method of claim 1 comprising:
   after the obtaining step, activating the combustion catalyst composition at a temperature below 150° C.

27. The method of claim 1 comprising exposing the species to the combustion catalyst composition using a desiccant-coupled catalytic combustion system.

\* \* \* \* \*